(12) United States Patent
Neuhauser et al.

(10) Patent No.: US 8,527,320 B2
(45) Date of Patent: Sep. 3, 2013

(54) METHODS AND SYSTEMS FOR INITIATING A RESEARCH PANEL OF PERSONS OPERATING UNDER A GROUP AGREEMENT

(75) Inventors: Alan R. Neuhauser, Silver Spring, MD (US); Jack C. Crystal, Owings Mill, MD (US); Jack K. Zhang, Ijamsville, MD (US)

(73) Assignee: Arbitron, Inc., Columbia, MD (US)

( * ) Notice: Subject to any disclaimer, the term of this patent is extended or adjusted under 35 U.S.C. 154(b) by 1009 days.

(21) Appl. No.: 11/643,160

(22) Filed: Dec. 20, 2006

(65) Prior Publication Data

US 2007/0294706 A1      Dec. 20, 2007

Related U.S. Application Data

(60) Provisional application No. 60/751,825, filed on Dec. 20, 2005.

(51) Int. Cl.
*G06Q 10/00* (2012.01)

(52) U.S. Cl.
USPC .......................................... 705/7.29

(58) Field of Classification Search
USPC .................................. 705/10, 7.29
See application file for complete search history.

(56) References Cited

U.S. PATENT DOCUMENTS

| | | |
|---|---|---|
| 2,662,168 A | 12/1953 | Scherbatskoy |
| 3,919,479 A | 11/1975 | Moon et al. |
| 4,230,990 A | 10/1980 | Lert, Jr. et al. |
| 4,450,551 A | 5/1984 | Kudo et al. |
| 4,677,466 A | 6/1987 | Lert, Jr. et al. |
| 4,697,209 A | 9/1987 | Kiewit et al. |
| 4,718,106 A | 1/1988 | Weinblatt |
| 4,739,398 A | 4/1988 | Thomas et al. |
| 4,843,562 A | 6/1989 | Kenyon et al. |
| 4,918,730 A | 4/1990 | Schultz |
| 4,930,011 A | 5/1990 | Kiewit |
| 4,955,070 A | 9/1990 | Welsh et al. |
| 5,023,929 A | 6/1991 | Call |
| 5,319,735 A | 6/1994 | Preuss et al. |

(Continued)

FOREIGN PATENT DOCUMENTS

| | | |
|---|---|---|
| CA | 2136054 A1 | 5/1996 |
| EP | 0713335 | 5/1996 |

(Continued)

OTHER PUBLICATIONS

More than just talk on the move: Uses and gratifications of the cellular phone L Leung, R Wei—Journalism and Mass Communication Quarterly, 2000—images4.wikia.nocookie.net.*

(Continued)

*Primary Examiner* — Jonathan G Sterrett
(74) *Attorney, Agent, or Firm* — Peter Zura; Barnes & Thornburg LLP

(57) ABSTRACT

Methods and systems for initiating participation of a user of a portable device (PUA) in a research operation using a respective one of a plurality of PUA's providing communication services pursuant to a single agreement with a communication service provider. Data identifying the PUA user is associated with data identifying a group of persons receiving communication services pursuant to the single agreement; and demographic data of the PUA user is associated with the data identifying the PUA user.

30 Claims, 13 Drawing Sheets

(56) References Cited

U.S. PATENT DOCUMENTS

| | | | |
|---|---|---|---|
| 5,382,970 A | 1/1995 | Kiefl | |
| 5,382,983 A | 1/1995 | Kwoh et al. | |
| 5,450,490 A | 9/1995 | Jensen et al. | |
| 5,457,807 A | 10/1995 | Weinblatt | |
| 5,481,294 A | 1/1996 | Thomas et al. | |
| 5,483,276 A | 1/1996 | Brooks et al. | |
| 5,512,933 A | 4/1996 | Wheatley et al. | |
| 5,579,124 A | 11/1996 | Aijala et al. | |
| 5,594,934 A | 1/1997 | Lu et al. | |
| 5,612,729 A | 3/1997 | Ellis et al. | |
| 5,629,739 A | 5/1997 | Dougherty | |
| 5,630,203 A | 5/1997 | Weinblatt | |
| 5,687,191 A | 11/1997 | Lee et al. | |
| 5,737,025 A | 4/1998 | Dougherty et al. | |
| 5,764,763 A | 6/1998 | Jensen et al. | |
| 5,787,334 A | 7/1998 | Fardeau et al. | |
| 5,828,325 A | 10/1998 | Wolosewicz et al. | |
| 5,945,932 A | 8/1999 | Smith et al. | |
| 5,991,735 A * | 11/1999 | Gerace | 705/10 |
| 6,154,484 A | 11/2000 | Lee et al. | |
| 6,175,627 B1 | 1/2001 | Petrovic et al. | |
| 6,467,089 B1 | 10/2002 | Aust et al. | |
| 6,615,038 B1 * | 9/2003 | Moles et al. | 455/418 |
| 6,745,011 B1 | 6/2004 | Hendrikson et al. | |
| 6,754,470 B2 | 6/2004 | Hendrikson et al. | |
| 6,845,360 B2 | 1/2005 | Jensen et al. | |
| 6,862,355 B2 | 3/2005 | Kolessar et al. | |
| 6,871,180 B1 | 3/2005 | Neuhauser et al. | |
| 6,898,762 B2 * | 5/2005 | Ellis et al. | 715/716 |
| 6,958,710 B2 | 10/2005 | Zhang et al. | |
| 7,587,732 B2 | 9/2009 | Wright et al. | |
| 2001/0053190 A1 | 12/2001 | Srinivasan | |
| 2002/0059218 A1 | 5/2002 | August et al. | |
| 2002/0138848 A1 * | 9/2002 | Alao et al. | 725/109 |
| 2002/0143607 A1 * | 10/2002 | Connelly | 705/10 |
| 2003/0005430 A1 | 1/2003 | Kolessar | |
| 2003/0032409 A1 * | 2/2003 | Hutcheson et al. | 455/414 |
| 2003/0110485 A1 | 6/2003 | Lu et al. | |
| 2003/0170001 A1 | 9/2003 | Breen | |
| 2003/0216961 A1 * | 11/2003 | Barry | 705/14 |
| 2004/0005900 A1 * | 1/2004 | Zilliacus | 455/466 |
| 2004/0170381 A1 | 9/2004 | Srinivasan | |
| 2004/0252816 A1 * | 12/2004 | Nicolas | 379/92.01 |
| 2005/0035857 A1 | 2/2005 | Zhang et al. | |
| 2005/0120389 A1 * | 6/2005 | Boss et al. | 725/135 |
| 2005/0200476 A1 | 9/2005 | Forr et al. | |
| 2005/0203798 A1 | 9/2005 | Jensen et al. | |
| 2005/0243784 A1 | 11/2005 | Fitzgerald et al. | |
| 2006/0028953 A1 | 2/2006 | Jensen et al. | |
| 2011/0126222 A1 | 5/2011 | Wright et al. | |

FOREIGN PATENT DOCUMENTS

| | | |
|---|---|---|
| EP | 0 887 958 A1 | 6/1998 |
| EP | 1213860 | 6/2002 |
| EP | 1026847 | 9/2002 |
| EP | 1392009 | 5/2011 |
| WO | 91/11062 A1 | 7/1991 |
| WO | 94/17609 A1 | 8/1994 |
| WO | 9810539 | 3/1998 |
| WO | WO02/33854 | 4/2002 |
| WO | 2005/038625 A2 | 4/2005 |
| WO | 2005071961 | 8/2005 |
| WO | 2006/014362 A1 | 2/2006 |

OTHER PUBLICATIONS

Personalized recommender systems in e-commerce and m-commerce: a comparative study A Zenebe, A Ozok, AF Norcio—Proceedings of the 11 th International Conference . . . , Jul. 2005—Citeseer.*

A probabilistic model for music recommendation considering audio features—Q Li, SH Myaeng, DH Guan, BM Kim—Lecture notes in computer science, 2005—Springer.*

Bringing the wireless Internet to mobile devices—S Saha, M Jamtgaard, J Villasenor—Computer, 2001—ieeexplore.ieee.org.*

The Arbitron Radio Description of Methodology, Jul. 18, 2006.

W. Bender et al., "Techniques for data hiding", IBM Systems Journal, vol. 35, Nos. 3&4, 1996.

R. Walker, "Audio Watermaking", BBC Research and Development, 2004.

Australian Examination Report Appl. No. 2006327157, dated Dec. 14, 2012.

* cited by examiner

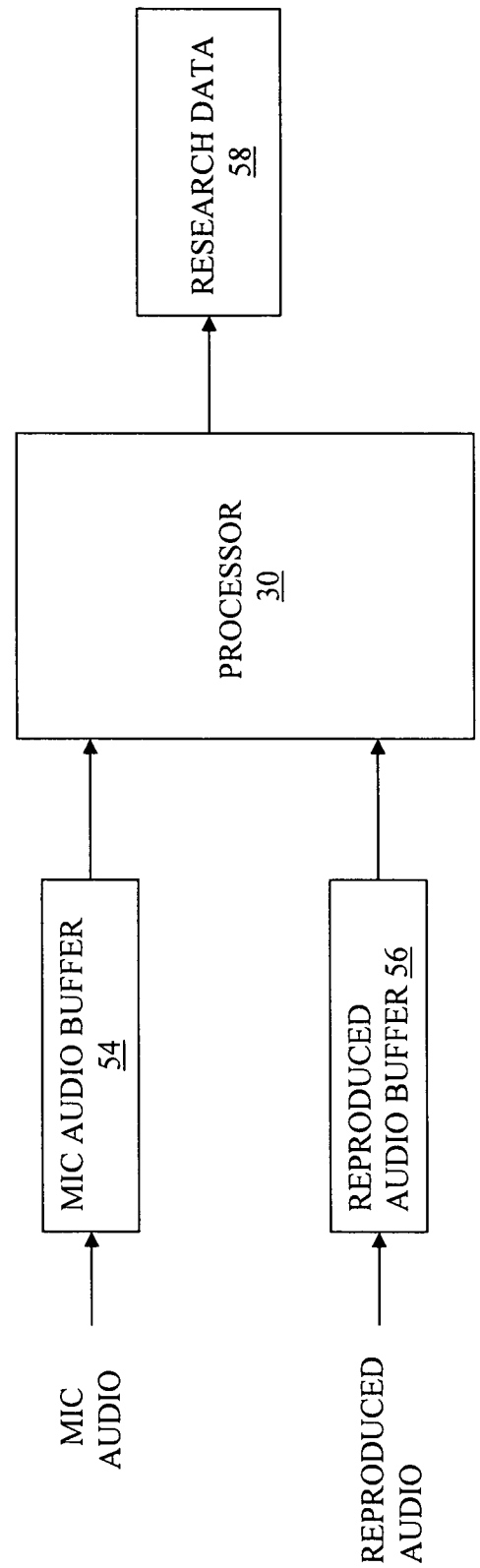

FIGURE 7A

| GROUP AGREEMENT 700 |
|---|
| USER #3456 |
| USER #3457 |
| USER #3458 |
| USER #3459 |

FIGURE 7B

| USER # | DEMOGRAPHIC DATA |
|---|---|
| 3456 | 710 SEX:FEMALE<br>AGE:40<br>... |
| 3457 | 720 SEX:MALE<br>AGE:45<br>... |
| 3458 | 730 SEX:MALE<br>AGE:19<br>... |
| 3459 | 740 SEX:FEMALE<br>AGE:18<br>... |

FIGURE 8

| Band No. | | | | | | | | | | | | | | |
|---|---|---|---|---|---|---|---|---|---|---|---|---|---|---|
| 10 | | | | X | | | | X | | | | | | |
| 9 | | | X | | | | X | | | | | | X | |
| 8 | | X | | | | X | | | | X | | | | |
| 7 | | X | | | X | | | | | X | | | | |
| 6 | X | | | | X | | | | | X | | | | |
| 5 | | | | X | | | | | X | | | | | |
| 4 | | | X | | | | | X | | | | | X | |
| 3 | | X | | | | | X | | | | | X | | |
| 2 | X | | | | | X | | | | | X | | | |
| 1 | X | | | | X | | | | | X | | | | |
| Time Intervals | 1 | 2 | 3 | 4 | 5 | 6 | 7 | 8 | 9 | 10 | 11 | 12 | 13 | 14 |

METHODS AND SYSTEMS FOR INITIATING A RESEARCH PANEL OF PERSONS OPERATING UNDER A GROUP AGREEMENT

CROSS-RELATED APPLICATIONS

This application claims the benefit of U.S. provisional patent application No. 60/751,825, filed Dec. 20, 2005, in the names of Alan R. Neuhauser, Vijoy K. Gopalakrishnan, Jack C. Crystal, Jack K. Zhang, and Eugene L. Flanagan III.

BACKGROUND OF THE INVENTION

It has been proposed to monitor exposure of consumers to audio media by incorporating monitoring software in a cellular telephone, making use of the cellular telephone's hardware, including its microphone, CPU, memory capacity and communications capabilities.

Media usage data gathered with the use of cellular telephones would be correlated with the identity of the cellular telephone's user in order to produce estimates of audiences broken down by audience demographics. However, cellular telephone service is provided by a telephone service provider that is a separate entity from the entity that gathers the media usage data so that it is necessary to adapt the methodology for gathering such media usage data by means of cellular telephone to the business practices of the entities that supply cellular telephone service.

DISCLOSURE

For this application the following terms and definitions shall apply:

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of corresponding information in a different physical form or forms.

The terms "media data" and "media" as used herein mean data which is widely accessible, whether over-the-air, or via cable, satellite, network, internetwork (including the Internet), print, displayed, distributed on storage media, or by any other means or technique that is humanly perceptible, without regard to the form or content of such data, and including but not limited to audio, video, text, images, animations, databases, files, broadcasts, displays (including but not limited to video displays, posters and billboards), signs, signals, web pages, print media and streaming media data.

The term "presentation data" shall mean media data or content other than media data to be presented to a user.

The term "research data" as used herein means data comprising (1) data concerning usage of media, (2) data concerning exposure to media, and/or (3) market research data.

The terms "gather" and "gathering" as used herein include both directly gathering data with the use of a device as well as emitting data from a device that causes or enables another device to gather data.

The term "research operation" as used herein means an operation comprising gathering, storing and/or communicating research data.

The term "database" as used herein means an organized body of related data, regardless of the manner in which the data or the organized body thereof is represented. For example, the organized body of related data may be in the form of a table, a map, a grid, a packet, a datagram, a file, an e-mail, a message, a document, a list or in any other form.

The term "network" as used herein includes both networks and internetworks of all kinds, including the Internet, and is not limited to any particular network or internetwork.

The terms "first," "second," "primary," and "secondary" are used herein to distinguish one element, set, data, object, step, process, function, action or thing from another, and are not used to designate relative position, arrangement in time or relative importance, unless otherwise stated explicitly.

The terms "coupled", "coupled to", and "coupled with" as used herein each mean a relationship between or among two or more devices, apparatus, files, circuits, elements, functions, operations, processes, programs, media, components, networks, systems, subsystems, and/or means, constituting any one or more of (a) a connection, whether direct or through one or more other devices, apparatus, files, circuits, elements, functions, operations, processes, programs, media, components, networks, systems, subsystems, or means, (b) a communications relationship, whether direct or through one or more other devices, apparatus, files, circuits, elements, functions, operations, processes, programs, media, components, networks, systems, subsystems, or means, and/or (c) a functional relationship in which the operation of any one or more devices, apparatus, files, circuits, elements, functions, operations, processes, programs, media, components, networks, systems, subsystems, or means depends, in whole or in part, on the operation of any one or more others thereof.

The terms "communicate", and "communicating" as used herein include both conveying data from a source to a destination, and delivering data to a communications medium, system, channel, device, wire, cable, fiber, circuit or link to be conveyed to a destination, and the term "communication" as used herein means data so conveyed or delivered. The term "communications' as used herein includes one or more of a communications medium, system, channel, device, wire, cable, fiber, circuit and link.

The term "processor" as used herein means processing devices, apparatus, programs, circuits, components, systems and subsystems, whether implemented in hardware, software or both, and whether or not programmable. The term "processor" as used herein includes, but is not limited to computers, hardwired circuits, signal modifying devices and systems, devices and machines for controlling systems, central processing units, programmable devices, field programmable gate arrays, application specific integrated circuits, systems on a chip, systems comprised of discrete elements and circuits, state machines, virtual machines and combinations of any of the foregoing.

The terms "storage" and "data storage" as used herein mean data storage devices, apparatus, programs, circuits, components, systems, subsystems and storage media serving to retain data, whether on a temporary or permanent basis, and to provide such retained data.

The terms "panelist," "panel member" and "participant" are interchangeably used herein to refer to a person who is, knowingly or unknowingly, participating in a study to gather information, whether by electronic, survey or other means, about that person's activity.

The term "household" as used herein is to be broadly construed to include family members, a family living at the same residence, a group of persons related or unrelated to one another living at the same residence, and a group of persons living within a common facility (of which the total number of unrelated persons does not exceed a predetermined number), such as a fraternity house, an apartment or other similar structure or arrangement.

The term "portable user appliance" (also referred to herein, for convenience, by the abbreviation "PUA") as used herein means an electrical or non-electrical device capable of being carried by or on the person of a user or capable of being disposed on or in, or held by, a physical object (e.g., attaché, purse) capable of being carried by or on the user, and having at least one function of primary benefit to such user, including without limitation, a cellular telephone, a personal digital assistant ("PDA"), a Blackberry device, a radio, a television, a game system (e.g., a Gameboy® device), a notebook computer, a laptop computer, a GPS device, an iPod® device, a DVD player, a walkie talkie, a personal communications device, a telematics device, a remote control device, a wireless headset, a wristwatch, a portable data storage device (e.g., Thumb™ drive), a camera, a recorder, a keyless entry transmitter device, a ring, a comb, a pen, a pencil, a notebook, a wallet, a tool, an implement, a pair of glasses, an article of clothing, a belt, a belt buckle, a fob, an article of jewelry, an ornamental article, a pair of shoes or other foot garment (e.g., sandals), a jacket, and a hat, as well as any devices combining any of the foregoing or their functions.

The term "activation message" as used herein shall mean data comprising at least one of (1) an activation command for a PUA for activating a capability of the PUA to perform a research operation, (2) activation data for a PUA for enabling and/or providing a capability of the PUA to perform a research operation, (3) visual display data for a PUA including a message soliciting participation of a user of the PUA in a research operation, (4) activation request data for a PUA requesting activation, enablement or installation of a capability thereof to perform a research operation, (5) a message for a user of a PUA requesting an action thereof to activate, enable and/or install a capability of the PUA to perform a research operation, and/or providing instructions for participating in a research operation automatically by means of a PUA, (6) a message for a user of a PUA providing or offering to provide a benefit to the user in exchange for the user's participation in a research operation, and (7) a message to a PUA and/or a user of a PUA requesting communication of a participation message in response.

The term "maintenance message" as used herein shall mean data comprising at least one of (1) a test command for a PUA to control an operation thereof to test its operational status or ability to perform a research operation, (2) test data for a PUA to establish, enable or provide a capability thereof to test its operational status or ability to perform a research operation, (3) a message requesting a response from a user of a PUA identifying such user, and/or providing demographic or other user-specific data of the user, (4) a message requesting system data of the PUA, and (5) a command or request for a PUA to perform a research operation.

The term "termination message" as used herein shall mean data comprising at least one of: (1) a deactivation message for a PUA to deactivate a capability thereof to perform a research operation; (2) a deactivation message for a user of a PUA instructing them to deactivate a capability of the PUA to perform a research operation; and (3) providing a benefit to a person as a final consideration for the person's previous participation in a research operation, or notifying the person that such a benefit will be or has been provided.

The term "participation message" as used herein shall mean data comprising at least one of (1) research data gathered automatically by a PUA, (2) a message from a PUA indicating an operational status or ability thereof to perform a research operation, or providing results of a test of such operational status or ability, (3) a message from a user of a PUA concerning participation of the user in a research operation by means of a PUA, or ancillary to such participation, such as concerning a benefit provided to the user for such participation or indicating activation or deactivation of an ability of a PUA to perform a research operation, (4) a message from a user of a PUA identifying such user and/or providing demographic and/or other user-specific data of the user, (5) a message providing system data of the PUA, (6) a message from a benefit provider concerning a benefit provided or to be provided to a user of a PUA for participation in a research operation, such as a message indicating receipt of a benefit request or a termination message requesting a benefit, and (7) a message from a PUA indicating receipt thereby of an activation message, a maintenance message or a termination message.

Methods and systems are disclosed in conjunction with the accompanying drawings, in which:

FIG. 1A is a functional block diagram for use in explaining certain embodiments involving the use of the PUA of FIG. 1;

FIG. 7A illustrates a relational database between PUA users and a group of persons receiving communication services pursuant to a single agreement;

FIG. 7B illustrates a relational database between PUA users and demographic data of the PUA users; and FIG. 8 is used to illustrate a signature extraction technique.

Figure 1:
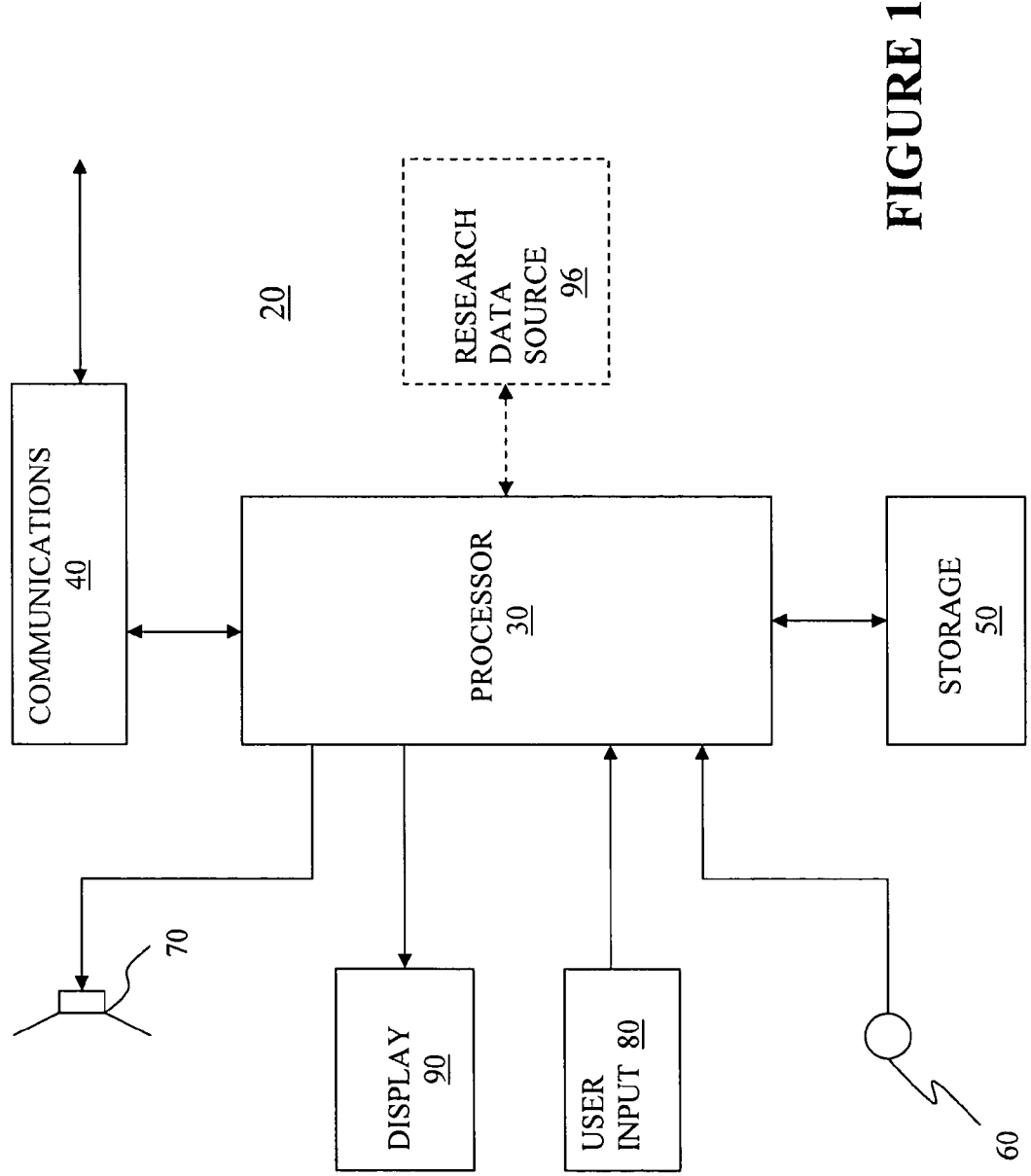
FIG. 1 is a block diagram of a PUA modified to carry out research operations.

A method of initiating participation of a PUA user in a research operation using a respective one of a plurality of PUA's providing communication services pursuant to a single agreement with a communication service provider, comprises associating data identifying the PUA user with data identifying a group of persons receiving communication services pursuant to the single agreement; and associating demographic data of the PUA user with the data identifying the PUA user. In certain embodiments, the data identifying the user comprises a screen name adopted by the user. In certain embodiments, a message is communicated to the respective one of the plurality of PUA's requesting the demographic data of the PUA user and a message is received comprising the demographic data of the PUA user from the respective one of the plurality of PUA's, and of these embodiments, in certain ones the message communicated to the respective one of the plurality of PUA's is communicated in response to receipt of a message from the PUA user indicating interest in participating in the research operation to gather research data.

A method of initiating participation of a PUA user in a research operation using a respective one of a plurality of PUA's providing communication services pursuant to a single agreement with a communication service provider, comprises associating data identifying the PUA user with data identifying a group of persons receiving communication services pursuant to the single agreement; receiving demographic data of the PUA user; and associating the demographic data of the PUA user with the data identifying the PUA user.

A system for initiating participation of a PUA user in a research operation using a respective one of a plurality of PUA's providing communication services pursuant to a single agreement with a communication service provider, comprises a processor configured to associate data identifying the PUA user with data identifying a group of persons receiving communication services pursuant to the single agreement; the processor being further configured to associate demographic data of the PUA user with the data identifying the PUA user. In certain embodiments, the data identifying the user comprises a screen name adopted by the user. In certain embodiments, a message is communicated to the respective one of the plurality of PUA's requesting the demographic data of the PUA user and a message is received comprising the demographic data of the PUA user from the respective one of the plurality of PUA's, and of these embodiments, in certain ones the message communicated to the respective one of the plurality of PUA's is communicated in response to receipt of a message from the PUA user indicating interest in participating in the research operation to gather research data. In certain embodiments, the system further comprises storage coupled with the processor, and the processor is operative to store the data identifying the PUA user in association with the data identifying the group of persons in the storage, and to store the demographic data of the PUA user in association with the data identifying the PUA user in the storage.

A system for initiating participation of a PUA user in a research operation using a respective one of a plurality of PUA's providing communication services pursuant to a single agreement with a communication service provider, comprises a processor configured to associate data identifying the PUA user with data identifying a group of persons receiving communication services pursuant to the single agreement; and communications coupled with the processor and operative to receive demographic data of the PUA user; the processor being operative to associate the demographic data of the PUA user with the data identifying the PUA user.

Numerous types of research operations are possible, including, without limitation, television and radio program audience measurement; exposure to advertising in various media, such as television, radio, print and outdoor advertising, among others; consumer spending habits; consumer shopping habits including the particular retail stores and other locations visited during shopping and recreational activities; travel patterns, such as the particular routes taken between home and work, and other locations; consumer attitudes, awareness and preferences; and so on. For the desired type of media and/or market research operation to be conducted, particular activity of individuals is monitored, or data concerning their attitudes, awareness and/or preferences is gathered. In certain embodiments research data relating to two or more of the foregoing are gathered, while in others only one kind of such data is gathered.

Various monitoring techniques are suitable. For example, television viewing or radio listening habits, including exposure to commercials therein, are monitored utilizing a variety of techniques. In certain techniques, acoustic energy to which an individual is exposed is monitored to produce data which identifies or characterizes a program, song, station, channel, commercial, etc. that is being watched or listened to by the individual. Where audio media includes ancillary codes that provide such information, suitable decoding techniques are employed to detect the encoded information, such as those disclosed in U.S. Pat. No. 5,450,490 and U.S. Pat. No. 5,764,763 to Jensen, et al., U.S. Pat. No. 5,579,124 to Aijala, et al., U.S. Pat. Nos. 5,574,962, 5,581,800 and 5,787,334 to Fardeau, et al., U.S. Pat. No. 6,871,180 to Neuhauser, et al., U.S. Pat. No. 6,862,355 to Kolessar, et al., U.S. Pat. No. 6,845,360 to Jensen, et al., U.S. Pat. No. 5,319,735 to Preuss et al., U.S. Pat. No. 5,687,191 to Lee, et al., U.S. Pat. No. 6,175,627 to Petrovich et al., U.S. Pat. No. 5,828,325 to Wolosewicz et al., U.S. Pat. No. 6,154,484 to Lee et al., U.S. Pat. No. 5,945,932 to Smith et al., US 2001/0053190 to Srinivasan, US 2003/0110485 to Lu, et al., U.S. Pat. No. 5,737,025 to Dougherty, et al., US 2004/0170381 to Srinivasan, and WO 06/14362 to Srinivasan, et al., all of which hereby are incorporated by reference herein.

Examples of techniques for encoding ancillary codes in audio, and for reading such codes, are provided in Bender, et al., "Techniques for Data Hiding", *IBM Systems Journal*, Vol. 35, Nos. 3 & 4, 1996, which is incorporated herein in its entirety. Bender, et al. disclose a technique for encoding audio termed "phase encoding" in which segments of the audio are transformed to the frequency domain, for example, by a discrete Fourier transform (DFT), so that phase data is produced for each segment. Then the phase data is modified to encode a code symbol, such as one bit. Processing of the phase encoded audio to read the code is carried out by synchronizing with the data sequence, and detecting the phase encoded data using the known values of the segment length, the DFT points and the data interval.

Bender, et al. also describe spread spectrum encoding and decoding, of which multiple embodiments are disclosed in the above-cited Aijala, et al. U.S. Pat. No. 5,579,124.

Still another audio encoding and decoding technique described by Bender, et al. is echo data hiding in which data is embedded in a host audio signal by introducing an echo. Symbol states are represented by the values of the echo delays, and they are read by any appropriate processing that serves to evaluate the lengths and/or presence of the encoded delays.

A further technique, or category of techniques, termed "amplitude modulation" is described in R. Walker, "Audio Watermarking", BBC Research and Development, 2004. In this category fall techniques that modify the envelope of the audio signal, for example by notching or otherwise modifying brief portions of the signal, or by subjecting the envelope to longer term modifications. Processing the audio to read the code can be achieved by detecting the transitions representing a notch or other modifications, or by accumulation or integration over a time period comparable to the duration of an encoded symbol, or by another suitable technique.

Another category of techniques identified by Walker involves transforming the audio from the time domain to some transform domain, such as a frequency domain, and then encoding by adding data or otherwise modifying the transformed audio. The domain transformation can be carried out by a Fourier, DCT, Hadamard, Wavelet or other transformation, or by digital or analog filtering. Encoding can be achieved by adding a modulated carrier or other data (such as noise, noise-like data or other symbols in the transform domain) or by modifying the transformed audio, such as by notching or altering one or more frequency bands, bins or combinations of bins, or by combining these methods. Still other related techniques modify the frequency distribution of the audio data in the transform domain to encode. Psychoacoustic masking can be employed to render the codes inaudible or to reduce their prominence. Processing to read ancillary codes in audio data encoded by techniques within this category typically involves transforming the encoded audio to the transform domain and detecting the additions or other modifications representing the codes.

A still further category of techniques identified by Walker involves modifying audio data encoded for compression (whether lossy or lossless) or other purpose, such as audio data encoded in an MP3 format or other MPEG audio format, AC-3, DTS, ATRAC, WMA, RealAudio, Ogg Vorbis, APT X100, FLAC, Shorten, Monkey's Audio, or other. Encoding involves modifications to the encoded audio data, such as modifications to coding coefficients and/or to predefined decision thresholds. Processing the audio to read the code is carried out by detecting such modifications using knowledge of predefined audio encoding parameters.

It will be appreciated that various known encoding techniques may be employed, either alone or in combination with the above-described techniques. Such known encoding techniques include, but are not limited to FSK, PSK (such as BPSK), amplitude modulation, frequency modulation and phase modulation.

In some cases a signature is extracted from transduced media data for identification by matching with reference signatures of known media data. Suitable techniques for this purpose include those disclosed in U.S. Pat. No. 5,612,729 to Ellis, et al. and in U.S. Pat. No. 4,739,398 to Thomas, et al., each of which is assigned to the assignee of the present application and both of which are incorporated herein by reference in their entireties.

Still other suitable techniques are the subject of U.S. Pat. No. 2,662,168 to Scherbatskoy, U.S. Pat. No. 3,919,479 to Moon, et al., U.S. Pat. No. 4,697,209 to Kiewit, et al., U.S. Pat. No. 4,677,466 to Lert, et al., U.S. Pat. No. 5,512,933 to Wheatley, et al., U.S. Pat. No. 4,955,070 to Welsh, et al., U.S. Pat. No. 4,918,730 to Schulze, U.S. Pat. No. 4,843,562 to Kenyon, et al., U.S. Pat. No. 4,450,551 to Kenyon, et al., U.S. Pat. No. 4,230,990 to Lert, et al., U.S. Pat. No. 5,594,934 to Lu, et al., European Published Patent Application EP 0887958 to Bichsel and PCT publication WO 91/11062 to Young, et al., all of which are incorporated herein by reference in their entireties.

An advantageous signature extraction technique transforms audio data within a predetermined frequency range to the frequency domain by a transform function, such as an FFT. The FFT data from an even number of frequency bands (for example, eight, ten, sixteen or thirty two frequency bands) spanning the predetermined frequency range are used two bands at a time during successive time intervals. FIG. 8 provides an example of how pairs of the bands are selected during successive time intervals where the total number of bands used is equal to ten. The selected bands are indicated by an "X".

When each band is selected, the energy values of the FFT bins within such band and such time interval are processed to form one bit of the signature. If there are ten FFT's for each interval of the audio signal, for example, the values of all bins of such band within the first five FFT's are summed to form a value "A" and the values of all bins of such band within the last five FFT's are summed to form a value "B". In the case of a received broadcast audio signal, the value A is formed from portions of the audio signal that were broadcast prior to those used to form the value B.

To form a bit of the signature, the values A and B are compared. If B is greater than A, the bit is assigned a value "1" and if A is greater than or equal to B, the bit is assigned a value of "0". Thus, during each time interval, two bits of the signature are produced.

One advantageous technique carries out either or both of code detection and signature extraction remotely from the location where the research data is gathered, as disclosed in US Published Patent Application 2003/0005430 published Jan. 2, 2003 to Ronald S. Kolessar, which is assigned to the assignee of the present application and is hereby incorporated herein by reference in its entirety.

If location tracking or exposure to outdoor advertising is carried out, then various techniques for doing so are employed. Suitable techniques for location tracking or monitoring exposure to outdoor advertising are disclosed in U.S. Pat. No. 6,958,710 in the names of Jack K. Zhang, Jack C. Crystal, and James M. Jensen, issued Oct. 25, 2005, and US Published Patent Application 2005/0035857 A1 published Feb. 17, 2005 in the names of Jack K. Zhang, Jack C. Crystal, James M. Jensen and Eugene L. Flanagan III, filed Aug. 13, 2003, all of which are assigned to the assignee of the present application and hereby incorporated by reference herein in their entireties.

Where usage of publications, such as periodicals, books, and magazines, is monitored, suitable techniques for doing so are employed, such as those disclosed in U.S. patent application Ser. No. 11/084,481 in the names of James M. Jensen, Jack C. Crystal, Alan R. Neuhauser, Jack Zhang, Daniel W. Pugh, Douglas J. Visnius, and Eugene L. Flanagan III, filed Mar. 18, 2005, which is assigned to the assignee of the present application and hereby incorporated by reference herein in its entirety.

In addition to those types of research data mentioned above and the various techniques identified for gathering such types of data, other types of research data may be gathered and other types of techniques may be employed. For example, research data relating to consumer purchasing conduct, consumer product return conduct, exposure of consumers to products and presence and/or proximity to commercial establishments may be gathered, and various techniques for doing so may be employed. Suitable techniques for gathering data concerning presence and/or proximity to commercial establishments are disclosed in US Published Patent Application 2005/0200476 A1 published Sep. 15, 2005 in the names of David Patrick Forr, James M. Jensen, and Eugene L. Flanagan III, filed Mar. 15, 2004, and in US Published Patent Application 2005/0243784 A1 published Nov. 3, 2005 in the names of Joan Fitzgerald, Jack Crystal, Alan Neuhauser, James M. Jensen, David Patrick Forr, and Eugene L. Flanagan III, filed Mar. 29, 2005. Suitable techniques for gathering data concerning exposure of consumers to products are disclosed in US Published Patent Application 2005/0203798 A1 published Sep. 15, 2005 in the names of James M. Jensen and Eugene L. Flanagan III, filed Mar. 15, 2004.

Moreover, techniques involving the active participation of the panel members may be used in research operations. For example, surveys may be employed where a panel member is asked questions utilizing the panel member's PUA after recruitment. Thus, it is to be understood that both the exemplary types of research data to be gathered discussed herein and the exemplary manners of gathering research data as discussed herein are only illustrative and that other types of research data may be gathered and that other techniques for gathering research data may be employed.

Various PUA's already have capabilities sufficient to enable the implementation of the desired monitoring technique or techniques to be employed during the research operation. As an example, cellular telephones have microphones which convert acoustic energy into audio data. Various cellular telephones further have processing and storage capability.

In certain embodiments, various existing PUA's are modified merely by software and/or minor hardware changes to carry out a research operation. In certain other embodiments, PUA's are redesigned and substantially reconstructed for this purpose. In certain embodiments the PUA is coupled with a separate research data gathering system and provides operations ancillary or complementary thereto.

In certain embodiments, the PUA itself is operative to gather research data. In certain embodiments, the PUA emits data that causes another device to gather research data. Such embodiments include various embodiments disclosed in U.S. Pat. No. 6,958,710 and in U.S. patent application Ser. No. 11/084,481, referenced above. In certain embodiments, the PUA is operative both to gather research data and to emit data that causes another device to gather research data.

FIG. 1 is a block diagram of a PUA 20 (such as a cellular telephone or other data processing and communicating device) modified to carry out a research operation. The PUA 20 comprises a processor 30 that is operative to exercise overall control and to process audio and other data for transmission or reception and communications 40 coupled to the processor 30 and operative under the control of processor 30 to perform those functions required for establishing and maintaining a two-way wireless communication link with a PUA network. In certain embodiments, processor 30 also is operative to execute applications ancillary or unrelated to the conduct of PUA communications, such as applications serving to download audio and/or video data to be reproduced by PUA 20, e-mail clients and applications enabling the user to play games using the PUA 20. In certain embodiments, processor 30 comprises two or more processing devices, such as a first processing device (such as a digital signal processor) that processes audio, and a second processing device that exercises overall control over operation of the PUA 20. In certain embodiments, processor 30 employs a single processing device. In certain embodiments, some or all of the functions of processor 30 are implemented by hardwired circuitry.

PUA 20 further comprises storage 50 coupled with processor 30 and operative to store data as needed. In certain embodiments, storage 50 comprises a single storage device, while in others it comprises multiple storage devices. In certain embodiments, a single device implements certain functions of both processor 30 and storage 50.

In addition, PUA 20 comprises a microphone 60 coupled with processor 30 to transduce the user's voice to an electrical signal which it supplies to processor 30 for encoding, and a speaker and/or earphone 70 coupled with processor 30 to transduce received audio from processor 30 to an acoustic output to be heard by the user. PUA 20 also includes a user input 80 coupled with processor 30, such as a keypad, to enter telephone numbers and other control data, as well as a display 90 coupled with processor 30 to provide data visually to the user under the control of processor 30.

In certain embodiments, the PUA 20 provides additional functions and/or comprises additional elements. In certain ones of such embodiments, the PUA 20 provides e-mail, text messaging and/or web access through its wireless communications capabilities, providing access to media and other content. For example, Internet access by the PUA 20 enables access to video and/or audio content that can be reproduced by the cellular telephone for the user, such as songs, video on demand, video clips and streaming media. In certain embodiments, storage 50 stores software providing audio and/or video downloading and reproducing functionality, such as iPod® software, enabling the user to reproduce audio and/or video content downloaded from a source, such as a personal computer via communications 40 or through direct Internet access via communications 40.

To enable PUA 20 to gather research data, namely, data indicating exposure to audio such as programs, music and advertisements, in certain embodiments, research software is installed in storage 50 to control processor 30 to gather such data and communicate it via communications 40 to a research organization. The research software in certain embodiments also controls processor 30 to store the data for subsequent communication.

In certain embodiments, the research software controls the processor 30 to decode ancillary codes in the transduced audio from microphone 60 using one or more of the known techniques identified hereinabove, and then to store and/or communicate the decoded data for use as research data indicating encoded audio to which the user was exposed. In certain embodiments, the research software controls the processor 30 to extract signatures from the transduced audio from microphone 60 using one or more of the known techniques identified hereinabove, and then to store and/or communicate the extracted signature data for use as research data to be matched with reference signatures representing known audio to detect the audio to which the user was exposed. In certain embodiments, the research software both decodes ancillary codes in the transduced audio and extracts signatures therefrom for identifying the audio to which the user was exposed. In certain embodiments, the research software controls the processor 30 to store samples of the transduced audio, either in compressed or uncompressed form for subsequent processing either to decode ancillary codes therein or to extract signatures therefrom. In certain ones of these embodiments, the compressed or uncompressed audio is communicated to a remote processor for decoding and/or signature extraction.

Where the PUA 20 possesses functionality to download and/or reproduce presentation data, in certain embodiments research data concerning the usage and/or exposure to such presentation data as well as audio data received acoustically by microphone 60, is gathered by PUA 20 in accordance with the technique illustrated by the functional block diagram of FIG. 1A. Storage 50 of FIG. 1 implements an audio buffer 54 for audio data gathered with the use of microphone 60. In certain ones of these embodiments storage 50 implements a buffer 56 for presentation data downloaded and/or reproduced by PUA 20 to which the user is exposed via speaker and/or earphone 70 or display 90, or by means of a device coupled with PUA 20 to receive the data therefrom to present it to a user. In some of such embodiments, the reproduced data is obtained from downloaded data, such as songs, web pages or audio/video data (e.g., movies, television programs, video clips). In some of such embodiments, the reproduced data is provided from a device such as a broadcast or satellite radio receiver of the PUA 20 (not shown for purposes of simplicity and clarity). In certain ones of these embodiments storage 50 implements a buffer 56 for metadata of presentation data reproduced by PUA 20 to which the user is exposed via speaker and/or earphone 70 or display 90, or by means of a device coupled with PUA 20 to receive the data therefrom to present it to a user. Such metadata can be, for example, a URL from which the presentation data was obtained, channel tuning data, program identification data, an identification of a prerecorded file from which the data was reproduced, or any data that identifies and/or characterizes the presentation data, or a source thereof. Where buffer 56 stores audio data, buffers 54 and 56 store their audio data (either in the time domain or the frequency domain) independently of one another. Where buffer 56 stores metadata of audio data, buffer 54 stores its audio data (either in the time domain or the frequency domain) and buffer 56 stores its metadata, each independently of the other.

Processor 30 separately produces research data 58 from the contents of each of buffers 54 and 56 which it stores in storage 50. In certain ones of these embodiments, one or both of buffers 54 and 56 is/are implemented as circular buffers storing a predetermined amount of audio data representing a most recent time interval thereof as received by microphone 60 and/or reproduced by speaker and/or earphone 70, or downloaded by PUA 20 for reproduction by a different device coupled with PUA 20. Processor 30 extracts signatures and/or decodes ancillary codes in the buffered audio data to produce research data. Where metadata is received in buffer 56, in certain embodiments the metadata is used, in whole or in part, as research data 58, or processed to produce research data 58. The research data is thus gathered representing exposure to and/or usage of audio data by the user where audio data is received in acoustic form by the PUA 20 and where presentation data is received in non-acoustic form (for example, as a cellular telephone communication, as an electrical signal via a cable from a personal computer or other device, as a broadcast or satellite signal or otherwise).

In certain embodiments, the PUA 20 is provided with a research data source 96 coupled by a wired or wireless coupling with processor 30 for use in gathering further or alternative research data to be communicated to a research organization. In certain ones of these embodiments, the research data source 96 comprises a location data producing device or function providing data indicating a location of the PUA 20. Various devices appropriate for use as source 96 include a satellite location signal receiver, a terrestrial location signal receiver, a wireless networking device that receives location data from a network, an inertial location monitoring device and a location data producing service provided by a PUA service provider. In certain embodiments, research data source 96 comprises a device or function for monitoring exposure to print media, for determining whether the user is at home or out of home, for monitoring exposure to products, exposure to displays (such as outdoor advertising), presence within or near commercial establishments, or for gathering research data (such as consumer attitude, preference or opinion data) through the administration of a survey to the user of the PUA 20. In certain embodiments, research data source 96 comprises one or more devices for receiving, sensing or detecting data useful in implementing one or more of the foregoing functions, other research data gathering functions and/or for producing data ancillary to functions of gathering, storing and/or communicating research data, such as data indicating whether the panelist has complied with predetermined rules governing the activity or an extent of such compliance. Such devices include, but are not limited to, motion detectors, accelerometers, temperature detectors, proximity detectors, satellite positioning signal receivers, RFID readers, RF receivers, wireless networking transceivers, wireless device coupling transceivers, pressure detectors, deformation detectors, electric field sensors, magnetic field sensors, optical sensors, electrodes, and the like.

Figure 2:
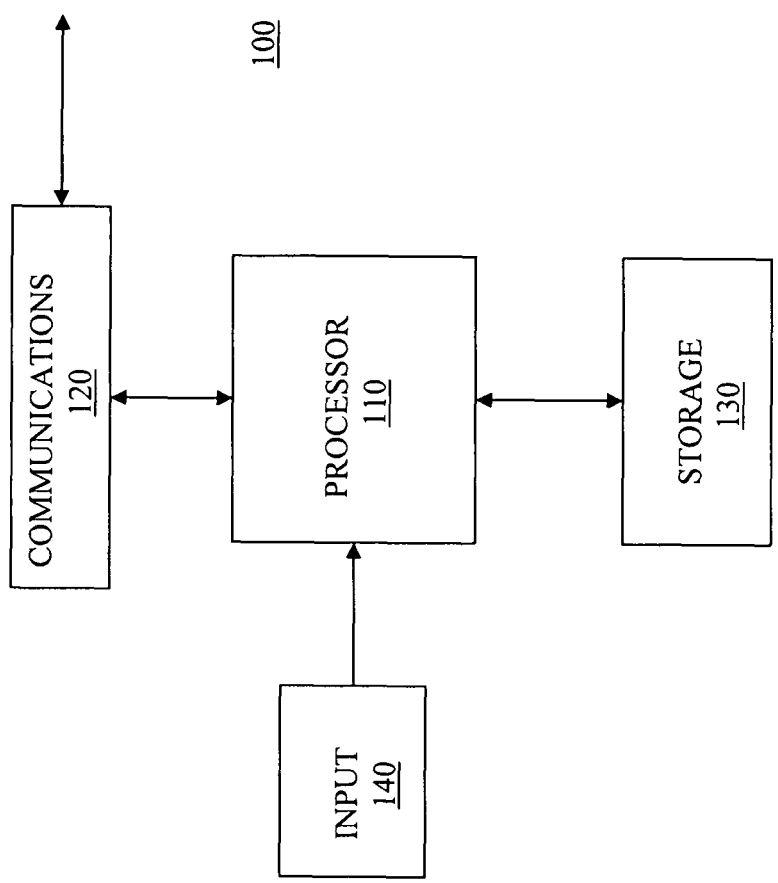
FIG. 2 is a block diagram of a system for setting up, promoting, operating, maintaining and/or terminating research operations with the use of multiple PUA's, such as that illustrated in FIG. 1.

FIG. 2 is a block diagram of a system 100 for setting up, promoting, operating, maintaining and/or terminating research operations with the use of multiple cellular telephones or other PUA's having communications capabilities, such as that illustrated in FIG. 1. For these purposes, the system 100 operates under the control of a processor 110 to communicate messages to the PUA 20, and receive communications therefrom, by means of communications 120 coupled with processor 110 and with PUA 20. In certain embodiments, communications 120 is coupled with PUA 20 via a cellular telephone network. In certain embodiments, communications 120 is coupled with PUA 20 via the Internet or other network via a host or device (e.g., a telephone terminal or connection) able to communicate via such a network coupled with PUA 20, such as a personal computer, or via a wireless link or cable coupling the PUA 20 with such a network so that the PUA 20 functions as a host or device communicating on the network.

Instructions for operating processor 110 as well as research data received by the system 100 are stored in storage 130 coupled with processor 110. An input device or devices 140 coupled with processor 110 enable a user of the system 100 to enter commands and/or data such as system commands (for example, a system startup command or a command to enter a system maintenance mode), research data and/or software updates or other modifications. System 100 in certain embodiments is maintained by a research organization. In certain embodiments, system 100 is maintained by another entity acting for or on behalf such a research organization. The operation of system 100 in cooperation with PUA 20 to set up, promote, operate, maintain and/or terminate research operations, is further described hereinbelow.

In order to identify PUA users for random sampling to establish a panel of such users for gathering research data, in certain embodiments one or more lists of subscribers are obtained from PUA service providers and the users are contacted at random to recruit them to participate on the panel. In certain instances, publicly available records may be sufficient to identify the users. Public records include telephone number and address directories, e-mail directories, and various governmental filings, among other records. Other public and non-public information, such as warranty records (e.g., from completed warranty cards), and retail store records containing purchaser information, may be utilized. In certain other embodiments, the identities of the owners and/or users of the PUAs to be employed are not ascertainable and thus are obtained from the users themselves. In certain embodiments, combinations of the foregoing user identification methods are used.

In certain embodiments, PUA users are recruited through a communication using a means other than their PUAs, such as by mail, e-mail, a call to a landline telephone number or by personal contact, while in certain embodiments, a widely disseminated solicitation is used, such as an advertisement or notice in one or more types of media. In certain embodiments, PUA users are contacted by system 100 of FIG. 2 or by other means via their PUAs, such as PUA 20, by supplying an appropriate communication which causes the PUA to provide a predetermined audible and/or visual message to the user providing a request for participation as a panel member. With reference again to FIG. 1, in certain ones of such embodiments, the communication comprises a live, synthesized or recorded voice call to the PUA 20 either from system 100 or by other means, while in certain ones of such embodiments, the communication comprises a visual message from system 100 to PUA 20 and provided thereby to the user via display 90. Such a visual message may be an e-mail, a text message, a web page or the like. In certain ones of such embodiments, the PUA 20 is provided to the user with software operative to control the PUA to communicate the message in audible and/or visual form to the user, with or without receipt of an activation message in the PUA to initiate the communication of the audible and/or visual message to the user. In certain ones of such embodiments, the visual display message is operative to control the PUA 20 to display an interactive control enabling the user to communicate an acceptance of the request to participate in the panel to the system 100. Such control may be a form, an e-mail address, a telephone number or the like and in certain embodiments, requests demographic information of the user and/or provides instructions for participating in a research operation by means of the user's cellular telephone.

In certain embodiments, multiple messages are communicated to users to recruit them. In certain ones of such embodiments, a first recruitment message is communicated containing data to indicate to the user that participants are being recruited and requesting the user to consider participating. Subsequently, a second recruitment message is communicated to the user containing data directly requesting the user's participation. In some implementations the first message is communicated by system 100 as an automatically generated message, while in others it is a widely disseminated message. In some implementations the first message contains data indicating that a benefit will be provided to the user for such participation or agreement to participate, as an incentive for the user to agree to participate. This gives the user an opportunity to consider the desirability of receiving the benefit before receiving the second message soliciting his/her participation, and thus serves as a pre-recruitment tool.

In order to encourage participation in such research operation, in certain embodiments the recruitment message provides or offers to provide a benefit to the user in exchange for the user's participation or agreement or willingness to participate in a research operation. In certain ones of such embodiments, the benefit is provided in response to a message from the user, via the PUA 20, indicating a willingness or agreement to participate in the research operation, and in certain cases a message is communicated by system 100 to PUA 20 indicating that the benefit is being provided, such as a cash benefit, a credit or a service, and a corresponding instruction for provision of the service is communicated by system 100 to an appropriate benefit provider. In certain ones of such embodiments, the offered benefit comprises a service provided by means of the PUA, such as voice, text message and/or e-mail communication services, other Internet services and/or access to certain applications (e.g., games or personal information management software), content or media data (such as ring tones, images, audio/video data, or songs). In certain ones of such embodiments, the offered benefit comprises cash or a credit, or a service provided apart from the use of the PUA. In certain ones of such embodiments, an offer is made to provide a PUA comprising a research data gathering system and/or a service provided by means of a PUA for a person's use conditioned on the person's participation in the research operation. Activation of the PUA to provide services to the user can be conditioned on such participation. In certain ones of such embodiments, the recruitment message is communicated to the PUA with an offer to provide a service with the use of the PUA or to activate such a service, such as voice or other data communication services or access to content such as audio or video content. The provision of the service is initiated or the service is activated in certain ones of such embodiments by communicating a benefit provision message to at least one of the cellular telephone and a service provider.

In certain embodiments, the PUA 20 as provided to the user stores software enabling it to gather, store and/or communicate research data, such as codes and/or signatures indicating exposure to audio media. In certain ones of such embodiments, the software is inoperative to carry out at least one of such gathering, storing or communicating functions until activated, by an action of the user (such as a command to the PUA entered by the user input 80 of the microphone 60, or data entered by the user indicating agreement to participate in the research operation) and/or by means of a communication received by the PUA from system 100. In certain ones of such embodiments, the software is enabled when the PUA is provided to the user.

In certain embodiments, the PUA 20 as provided to the user, while capable of gathering, storing and/or communicating research data when appropriate software runs on its processor 30, lacks some or all of such appropriate software. In certain ones of such embodiments, the PUA 20 is enabled to gather, store and/or communicate research data by downloading the required software from system 100. In certain ones of such embodiments, in response to a message expressing agreement to participate in a research data gathering, storage and/or communication activity or a different message from which such agreement can be inferred (such as a download request), the PUA 20 downloads the required software from system 100, as well as media data or other content (such as ring tones, images, audio/video data, or songs), games and/or other user software, provided as an incentive for such participation. The content and/or software can be sent from system 100 or from a different source. In certain ones of such embodiments, the user installs the software in the PUA 20 from external storage, such as a personal computer or external storage device, using a wireless communications link, a cable or an interface.

Various ways of responding to the recruitment message are provided in a variety of embodiments. In certain embodiments, the user responds to a recruitment message by communicating a message to system 100 or other destination in response via the PUA 20, either in the form of a voice call, a form containing the message, an e-mail, text message or the like, indicating a willingness or agreement to participate in the proposed research operation using the PUA. In certain embodiments, the responsive message is communicated by a different means, such as by a voice call using a different telephone, by mail, e-mail, a form provided by a web page, an in-person communication or the like. However the responsive message is communicated, in certain embodiments it includes demographic data and/or data that conveys other personal or household attributes to be stored in system 100. In certain embodiments, such data is communicated by a different message. In certain embodiments, a message is communicated from the PUA 20 in response to the recruitment message from which the user's willingness to participate can be inferred, such as a message to system 100 that conveys research data gathered by the PUA 20 where it is necessary for the user to activate its capability to gather, store and/or communicate research data or a message to system 100 requesting a download of software or other data required to provide, activate or enable the cellular telephone's capabilities to gather, store and/or communicate research data.

In certain embodiments, the PUA activates, installs and/or enables functionality to gather, store and/or communicate research data in response to or conditioned upon, the user's affirmative response to the recruitment message. In certain ones of such embodiments, an action of the user to produce, enter or communicate such an affirmative response using the PUA 20 activates such functionality implemented by software running on processor 30. In certain ones of such embodiments, such action of the user causes PUA 20 to request a download of software and/or data for installing, activating or enabling such functionality. In certain ones of such embodiments, such action of the user causes PUA 20 to install software provided with the recruitment message to implement such functionality, or else to make use of other data in or accompanying the recruitment message to implement such functionality.

Where the user responds to a widely disseminated solicitation, such as an advertisement, a notice, a documentary solicitation provided with the PUA or the like, the responsive message can be communicated as described hereinabove. In certain embodiments, a response to a widely disseminated solicitation takes a different form or includes different content, such as a request communicated to system 100 for download of software or other data required to initiate, install or activate the operation of the PUA to automatically gather, store and/or communicate research data, and/or a communication of research data from the PUA to system 100 from which the user's willingness to participate can be inferred.

Data indicating the recruitment of the user and indicating an identity of the PUA to be used in the research operation to gather, store and/or communicate research data by means of the PUA is stored in storage 130 of system 100 based on the responsive message. Research data gathered by means of such PUA is stored in association with data identifying the PUA.

It is desired to successfully recruit a substantial proportion of the users contacted. Where no response to a recruitment message is received or a response is received but indicates an unwillingness to participate, in certain embodiments negative data indicating a failure to recruit the user to participate in the research operation is stored in system 100 and subsequently a further recruitment message is communicated to the user to solicit participation in the research operation. The reason for failing to successfully recruit the user can be time-dependent. For example, the user might not have the PUA turned on during a time of day when the recruitment message is communicated, or the user might not be receptive to such a message at the time of day that the message is first sent. In certain ones of such embodiments, system 100 stores the time when the unsuccessful message was communicated and the further recruitment message is communicated under the control of system 100 at a time differing from the time at which the previous message was communicated. In certain ones of such embodiments, a content of a negative response from the user is employed as a basis for communicating the further recruitment message.

In certain embodiments, the recruitment message includes survey questions requesting the user to provide demographic or other data concerning the user or the user's household. Where fewer than all of the survey questions are answered, in certain embodiments, a further message is communicated to the user including a survey having fewer questions than the previous, uncompleted survey. In certain ones of such embodiments, the number of survey questions of the first message that were answered is used by system 100 to determine the number of questions included in the subsequent message. For example, if the user only answered three of eight questions contained in the first message, the subsequent message might include three or fewer questions to improve the likelihood that all will be answered by the user in a responsive message.

In certain embodiments, a response to the recruitment message is communicated by the PUA with or without any action by the user. In certain ones of such embodiments, the response comprises a message from the PUA indicating an operational status or ability thereof to gather, store and/or communicate research data and/or a message from the PUA indicating receipt of the recruitment message.

Where it is necessary to activate a capability of the PUA to automatically carry out a research operation, in response to the message from the user indicating a willingness to participate, in certain embodiments an activation message is communicated by system 100 to the PUA with a command or request to effect such activation. In certain embodiments, the activation message includes activation data to activate such capability, with or without an accompanying activation command. In certain ones of such embodiments, the activation data comprises a telephone number, a network address (such as an IP address, domain name, MAC address, or the like), a communication protocol or other data useful for communicating the research data gathered by means of the PUA. In certain ones of such embodiments, the activation data comprises software for running on the processor 30 of the PUA 20 to control, carry out and/or enable a research operation thereby. In certain embodiments, the activation message is communicated to the user, via PUA 20 or otherwise, by system 100 or by other means, and requests an action thereof to activate, enable and/or install a capability of the PUA to carry out a research operation and/or provides instructions for participating in a research operation automatically by means of the PUA 20.

In response to the message from the user indicating a willingness to participate, in certain embodiments a message is communicated by system 100 or by other means (for example, a live, synthesized or stored voice call, or in documentary form) to the user via the PUA or by other means providing instructions for participating in the research operation to gather, store and/or communicate research data automatically by means of the PUA. Where the user is offered an incentive to participate, such as cash, credit or a service, in certain embodiments, a message is communicated by system 100 in response to the message from the user to a provider of such incentive, such as a service provider, retailer or financial institution to instruct that the incentive be provided. In certain embodiments where the benefit comprises a service provided by means of the PUA, in response to the message from the user indicating a willingness to participate, system 100 communicates a message to the user and/or to the PUA enabling the PUA to provide the service or enabling the user to make use of the PUA to obtain the service. In certain ones of such embodiments, the service comprises a provision of media data or of content that is not widely available and a message is communicated by the system 100 or by a different source for such content in response to a message from system 100, to the PUA and/or the user comprising such media data or content and/or data enabling the user to access the media data or content by means of the PUA or otherwise.

In certain embodiments, an activation message is communicated to the PUA 20 by system 100 without regard to prior receipt of a participation message from the PUA or its user. In certain ones of such embodiments, the activation message comprises a request to the PUA 20 for data indicating an operational status thereof to gather, store and/or communicate research data and/or system data for the PUA, such as an identification thereof and/or data concerning its operating system that enables selection of appropriate software to run on the processor 30 thereof, and in response the PUA communicates the requested data to the system 100. A response to this message in certain ones of these embodiments can be used to build a database of potential panelists from whom such panelists may be recruited at random. It can also be employed as a means of determining one or more appropriate times to contact the user with a recruitment message. In certain ones of such embodiments, the activation message communicated by system 100 comprises a request to the PUA 20 or its user for research data gathered automatically by the PUA. This is useful where, for example, the user has previously entered data in the PUA indicating a willingness to participate in such a research operation, but where such data has not been communicated from the PUA. In certain ones of such embodiments, the activation message from system 100 comprises a request to the PUA for a response comprising a receipt for the activation message. A request of this kind can be used to determine that the PUA is operational. This is useful, for example, to build a database of potential panelists to be contacted subsequently or where no further data concerning the PUA or its user is required. In certain ones of such embodiments, the activation message comprises a message communicated from system 100 to PUA 20 comprising activation request data for the PUA 20 requesting activation of a capability thereof to gather, store and/or communicate research data to system 100 or elsewhere, or else requesting an action of the user to activate such capability. In certain ones of such embodiments, the PUA 20 responds (with or without any prior action by the user to effect such activation) by communicating one or more messages to system 100 comprising research data gathered automatically by the PUA 20, indicating an operational status or ability thereof to gather, store and/or communicate research data, indicating receipt by PUA 20 of the activation message and/or data from the user indicating a willingness or agreement to participate in the research operation.

With or without any prior communications between the system 100 and the PUA 20, the activation message in certain embodiments comprises instructions for participating in a research operation by means of the PUA 20. In certain ones of such embodiments, the PUA responds (with or without a prior action by the user that enables such response) by communicating a message to system 100 comprising at least one of research data gathered automatically by the PUA 20, a message from the PUA 20 indicating an operational status or ability thereof to gather, store and/or communicate research data, a message from the user of the PUA 20 concerning participation of the user in a research operation by means of the PUA, a message from the user of the PUA identifying such user and/or the PUA, and a message from the PUA indicating receipt thereby of the message from system 100. In some cases the message from PUA 20 to system 100 comprises data indicating a willingness or agreement of the user to participate in the research operation, which can be in the form of visual display data.

When a user's participation in the panel is terminated, in certain embodiments a termination message is communicated by system 100 to the user's PUA for one or more purposes. In certain embodiments, the PUA 20 responds by communicating a message to system 100 indicating that it has received the termination message. In certain ones of such embodiments, the termination message comprises a deactivation message to the PUA 20 to deactivate a research operation or an ability to carry it out, either automatically without any action of the user, or else instructing the user to deactivate such function. Of these embodiments, in certain ones the termination message also comprises data for producing a message to the user, conveyed either visually or audibly, notifying the user than such research operation has been deactivated. Of these embodiments, if the research operation is deactivated, in certain ones the PUA 20 subsequently communicates a responsive message to the system 100 to indicate that the research operation has been deactivated. Of these embodiments, in certain cases, the deactivation message deactivates one data gathering, storage and/or communication function, but permits another to continue in operation while providing a control to the user enabling the user to deactivate the function that continues in operation, and in certain ones of these embodiments, the provision of the control is conditioned on deactivation of the one function by the user and/or receipt of the deactivation message in the PUA. Where the termination message comprises a deactivation message directed to the user, and the user is promised a credit or other benefit as an incentive, in certain cases the provision of the credit or other benefit is conditioned on deactivation of the one function by the user.

In response to such a deactivation message, in certain embodiments the PUA 20 communicates a message to system 100 reporting that the function has been deactivated and/or a message acknowledging receipt of the deactivation message. In response to such a deactivation message, in certain embodiments, the user inputs a deactivation command in the PUA 20 instructing it to deactivate a capability thereof to gather, store and/or communicate research data.

In certain embodiments where the user is promised a credit or other benefit for participation as an incentive, the termination message comprises a message communicated by system 100 to a third party credit facility or other benefit provider instructing that a final benefit be provided to the user. In certain ones of these embodiments, a corresponding notice is communicated by system 100 to the user, via the PUA 20 or otherwise.

Figure 2A:
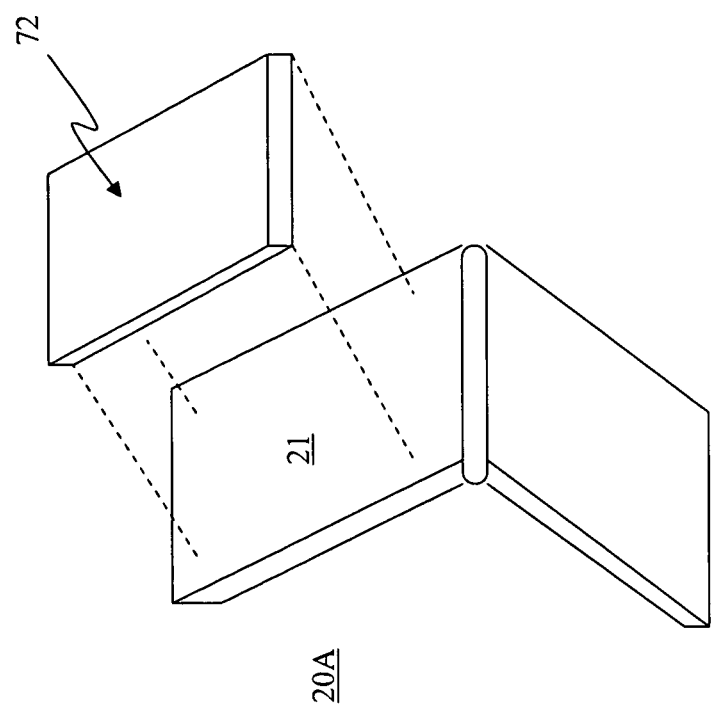
FIG. 2A is an exploded view of a PUA with a research data monitor affixed thereto.
Figure 2B:
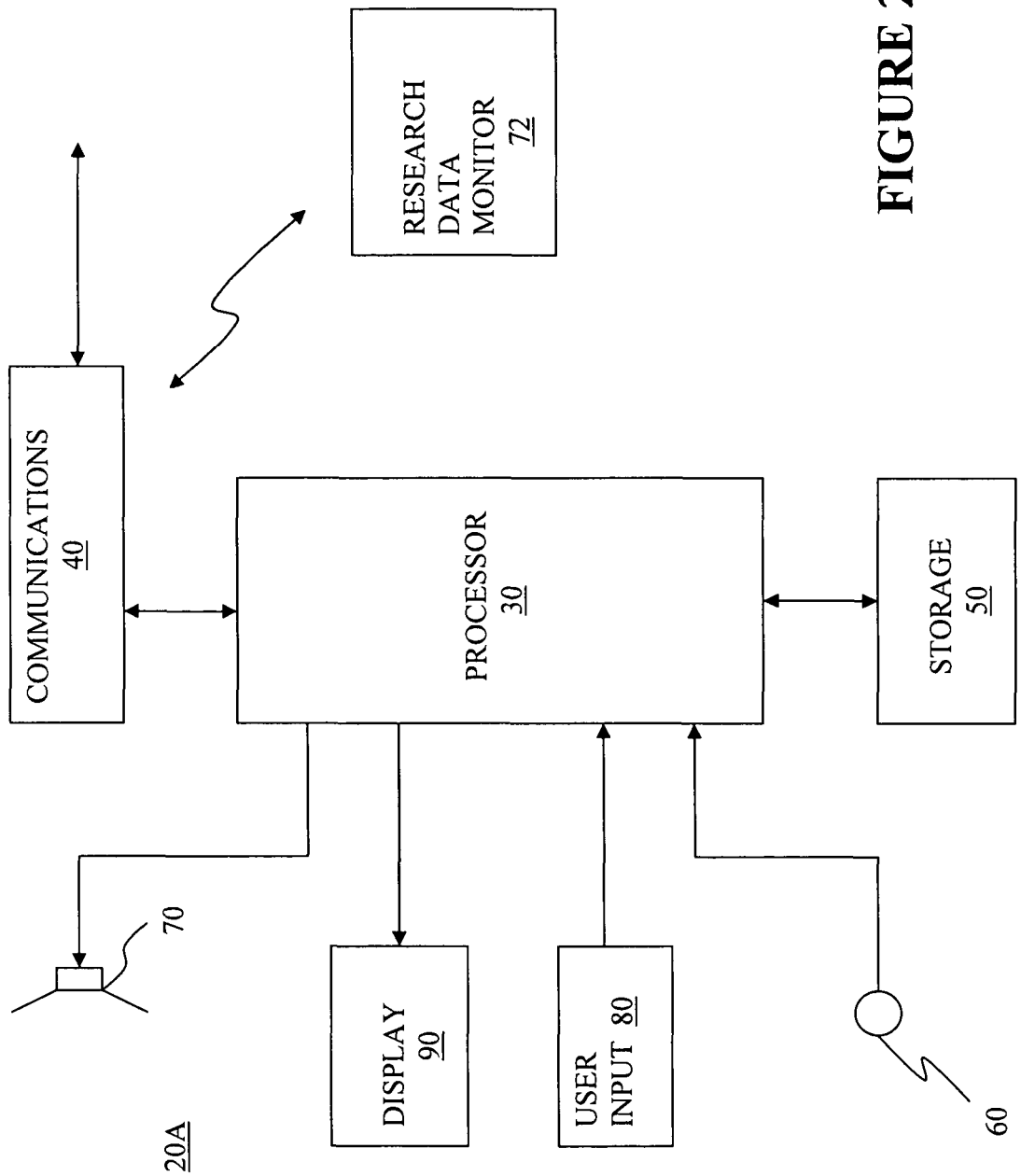
FIG. 2B is a block diagram illustrating the PUA of FIG. 2A coupled with the research data monitor thereof.

FIG. 2A illustrates a research data monitor 72 affixed to an outer surface 21 of a PUA 20A, wherein the monitor 72 is operative in certain embodiments to gather research data and communicate it to PUA 20A. PUA 20A is illustrated in the block diagram of FIG. 2B. As shown in FIG. 2B, PUA 20A comprises the same elements as PUA 20 of FIG. 1, except that research data source 96 is omitted from the embodiment of FIG. 2B.

Figure 2C:
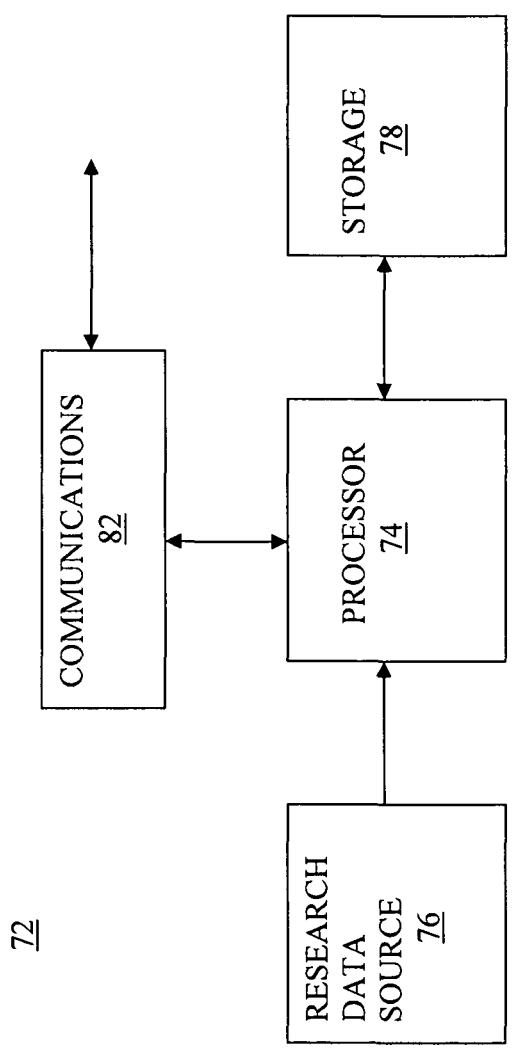
FIG. 2C is a block diagram of the research data monitor of FIGS. 2A and 2B.

Research data monitor 72 is illustrated in the block diagram of FIG. 2C. The research data monitor 72 comprises a processor 74 that is operative to exercise overall control of the monitor 72 and to process data for transmission or reception and communications 82 coupled to the processor 74 and operative under the control of processor 74 to perform those functions required for conducting communications with PUA 20A. In certain embodiments, processor 74 comprises two or more processing devices, such as a first processing device (such as a digital signal processor) that processes research data, such as audio data, and a second processing device that exercises overall control over operation of the monitor 72. In certain embodiments, processor 74 employs a single processing device. In certain embodiments, some or all of the functions of processor 74 are implemented by software, while in other embodiments, the functions of processor 74 are implemented in hardwired circuitry without the use of software.

In certain embodiments, communications 82 establishes and maintains a wireless communication link with communications 40 of PUA 20A, using a Bluetooth™ protocol, a ZigBee™ protocol, an inductive link, a capacitive link, an RF link, infrared link, or otherwise. In certain embodiments, communications 82 communicates with communications 40 using a wired link, such as a USB interface, a Firewire® interface, a connection to a plug or jack of the PUA 20A or an internal connection to PUA 20A.

Research data monitor 72 further comprises a research data source 76 coupled with processor 74. In certain embodiments, research data monitor 72 comprises a microphone that serves to transduce acoustic energy for processing by processor 74 to produce research data. In certain embodiments, research data source 76 comprises a keypad that enables the user to input data, such as channel or station data, user identification data or another kind of research data. In certain embodiments, monitor 72 comprises an RF receiver and/or infrared radiation detector. In certain embodiments, monitor 72 comprises a location data producing device or function providing data indicating a location of the monitor 72. Various devices appropriate for use as research data source 76 include a satellite location signal receiver, a terrestrial location signal receiver, a wireless networking device that receives location data from a network, an inertial location monitoring device and a location data producing service provided by a PUA service provider. In certain embodiments, monitor 76 comprises a device or function for monitoring exposure to print media, for determining whether the user is at home or out of home, for monitoring exposure to products, exposure to displays (such as outdoor advertising), presence within or near commercial establishments, or for gathering research data (such as consumer attitude, preference or opinion data) through the administration of a survey to the user of the PUA 20A. In certain embodiments, monitor 76 comprises one or more devices for receiving, sensing or detecting data useful in implementing one or more of the foregoing functions, other research data gathering functions and/or for producing data ancillary to functions of gathering, storing and/or communicating research data, such as data indicating whether the panelist has complied with predetermined rules governing the activity or an extent of such compliance. Such devices include, but are not limited to, motion detectors, accelerometers, temperature detectors, proximity detectors, satellite positioning signal receivers, RFID readers, RF receivers, wireless networking transceivers, wireless device coupling transceivers, pressure detectors, deformation detectors, electric field sensors, magnetic field sensors, optical sensors, electrodes, and the like.

Monitor 72 further comprises storage 78 coupled with processor 74 and operative to store data as needed. In certain embodiments, storage 78 comprises a single storage device, while in others it comprises multiple storage devices. In certain embodiments, a single device implements certain functions of both processor 74 and storage 78.

Figure 2D:
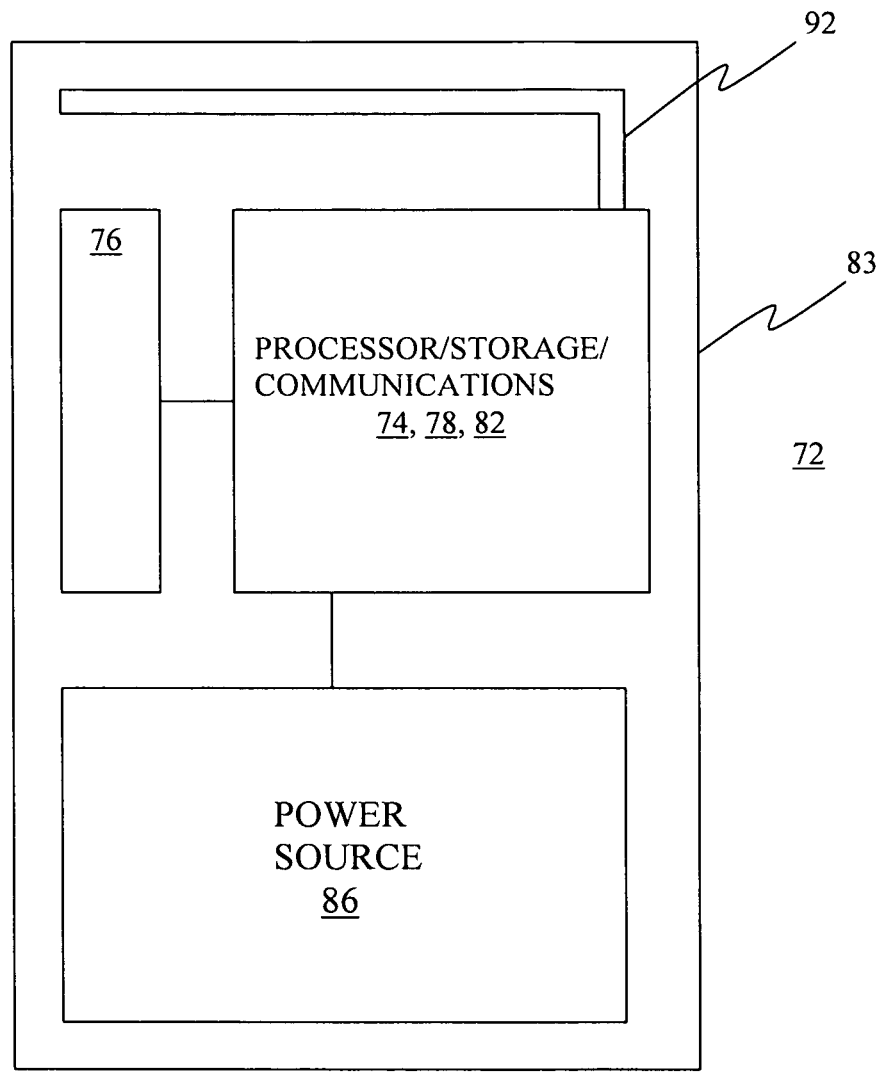
FIG. 2D is a layout diagram of an embodiment of the research data monitor of FIGS. 2A, 2B and 2C.

FIG. 2D illustrates an embodiment of research data monitor 72 fabricated on a substrate 83, such as a printed circuit board or a flexible substrate comprising paper, plastic or the like, on which certain elements of monitor 72 are printed on substrate 83. Power source 86 comprises a battery (either rechargeable or non-rechargeable) or a charge storage device such as a capacitor, printed on substrate 83. In the embodiment of FIG. 2D, communications 82 comprises an RF transceiver, such as a Bluetooth™ transceiver, a ZigBee™ transceiver or other RF transceiver. An antenna 92 is printed on substrate 83 and coupled with communications 82. It will be appreciated that monitor 72 can be fabricated to have a very thin profile and very low weight, so that it may be affixed to the enclosure of a cellular telephone, a PDA or other PUA that is carried on the person of a participant, without adding substantially to its size or weight. In certain embodiments, the monitor 72 is carried by a cover for the PUA (such as a decorative "skin"). In certain embodiments, monitor 72 is housed in or carried by a device separate from the PUA and adapted to be carried with the person of a panelist who carries the PUA.

Figure 2E:
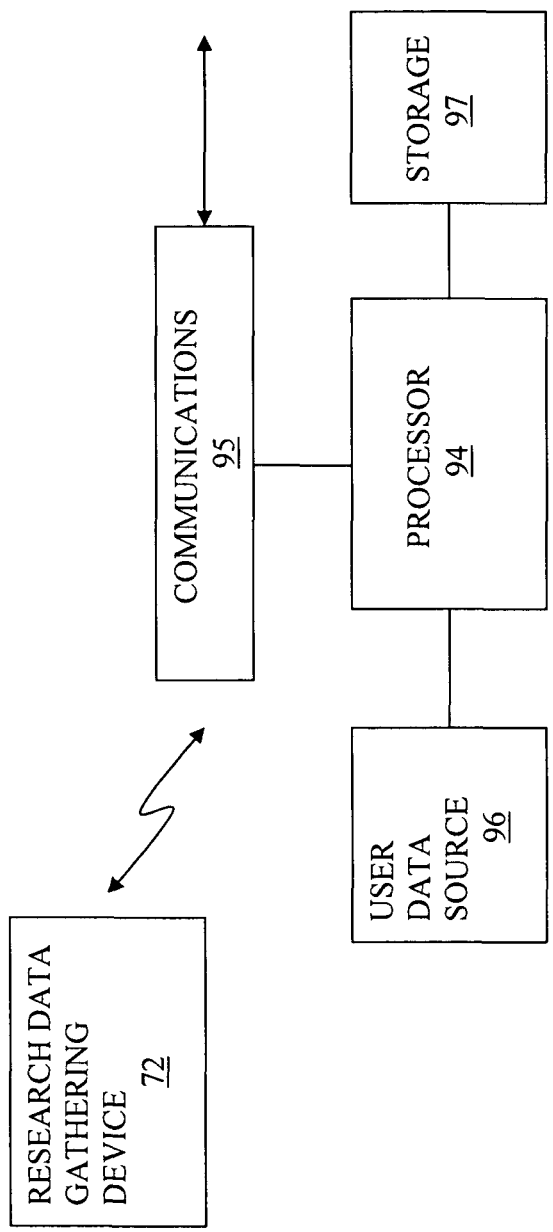
FIG. 2E is a block diagram of a PUA communicating with the research data monitor of FIGS. 2A, 2B and 2C.

FIG. 2E is a block diagram of a PUA comprising a personal communication device adapted to be carried on the person of a participant (such as a PDA, Blackberry® device, pager, notebook computer, walkie talkie, or the like) having a processor 94, and communications 95, user data source 96 and storage 97 coupled with processor 94. A research data gathering device 72, adapted to be carried on the person of a participant, is operative to gather research data and communicate the same wirelessly to communications 95 of the personal communication device for subsequent communication by the personal communication device to a research data processing facility. In certain embodiments, the research data gathering device 72 is separate from the personal communication device, so that it is carried by the participant separately therefrom. In certain ones of such embodiments, the device 72 is contained in a PUA such as an article of jewelry, an article of clothing, a fob, a wristwatch or other PUA. In certain ones of such embodiments, the device 72 is contained in its own enclosure and is carried on a lanyard to be worn about the participant's neck or provided with a pin, clasp or belt clip for attachment to an article of the participant's clothing.

Figure 3:
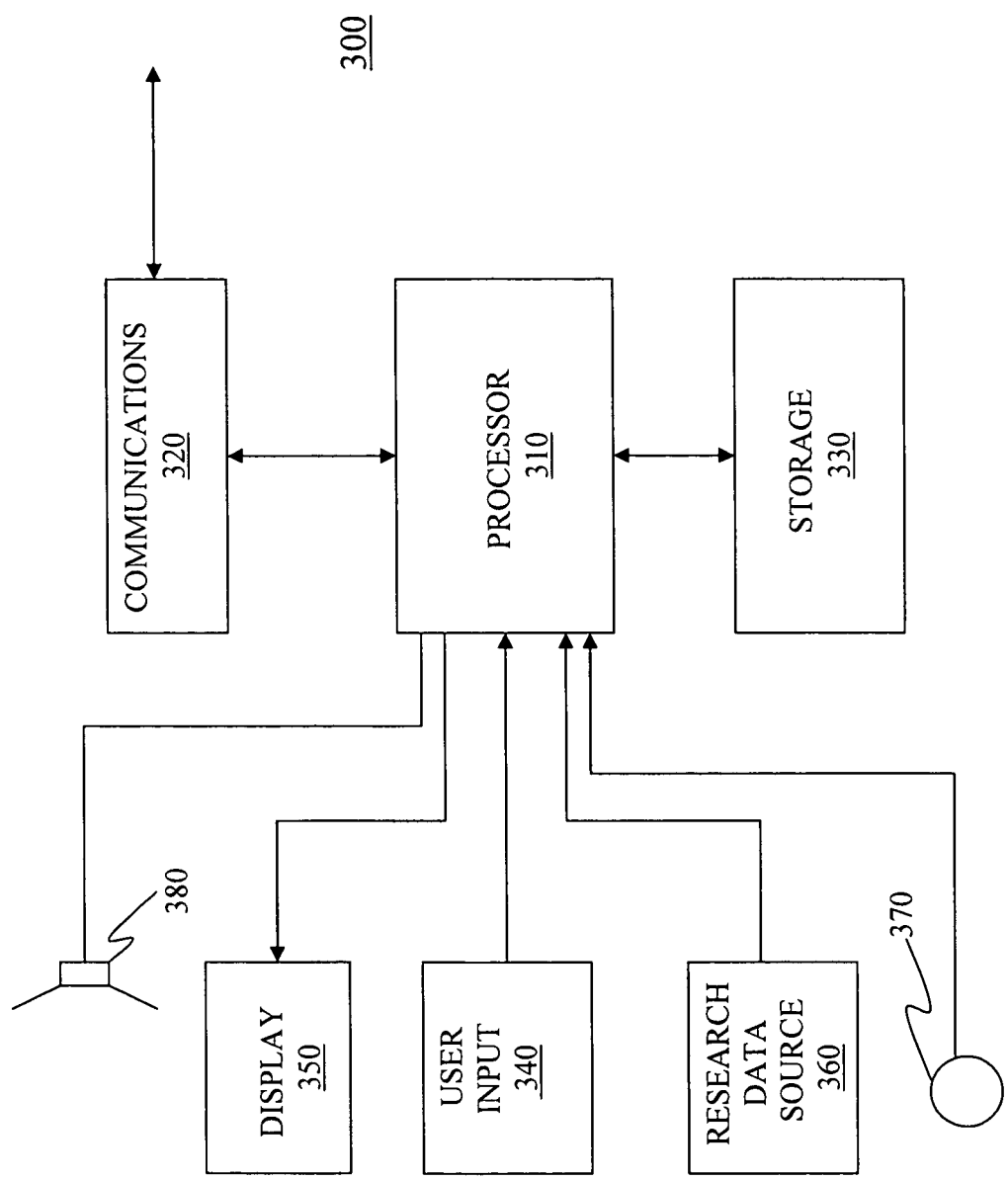
FIG. 3 is a block diagram of a personal digital assistant (PDA) modified to carry out research operations.

FIG. 3 is a block diagram of a personal digital assistant (PDA) 300 modified to gather research data. The PDA comprises a processor 310 that is operative to exercise overall control and to process data for, among other purposes, transmission or reception by the PDA and communications 320 coupled to the processor 310 and operative under the control of processor 310 to perform those functions required for establishing and maintaining two-way communications over a network (not shown for purposes of simplicity and clarity).

In certain embodiments, processor 310 comprises two or more processing devices, such as a first processing device that exercises overall control over operation of the PDA 300 and a second processing device that performs certain more specific operations such as digital signal processing. In certain embodiments, processor 310 employs a single processing device. In certain embodiments, some or all of the functions of processor 310 are implemented by hardwired circuitry.

PDA 300 further comprises storage 330 coupled with processor 310 and operative to store software that runs on processor 310, as well as temporary data as needed. In certain embodiments, storage 330 comprises a single storage device, while in others it comprises multiple storage devices. In certain embodiments, a single device implements certain functions of both processor 310 and storage 330.

PDA 300 also includes a user input 340 coupled with processor 310, such as a keypad, to enter commands and data, as well as a display 350 coupled with processor 310 to provide data visually to the user under the control of processor 310.

In certain embodiments, the PDA 300 provides additional functions and/or comprises additional elements. In certain embodiments, PDA 300 provides cellular telephone functionality, and comprises a microphone 370, as well as an ability of communications 320 to communicate wirelessly with a cell of a cellular telephone network, to enable its operation as a cellular telephone. Where PDA 300 possesses cellular telephone functionality, in certain embodiments PDA 300 is employed to gather, store and/or communicate research data, such as by storing appropriate research software in storage 330 to run on processor 310.

In certain embodiments, communications 320 of PDA 300 provides wireless communications via Bluetooth protocol, ZigBee™ protocol, wireless LAN protocol, infrared data link, inductive link or the like, to a network, network host or other device, and/or through a cable to such a network, network host or other device. In such embodiments, PDA 300 is employed to gather, store and/or communicate research data, such as by storing appropriate research software in storage 330 to run on processor 310.

In certain embodiments, the PDA is provided with a research data source 360 coupled by a wired or wireless coupling with processor 310 for use in gathering further or alternative research data to be communicated to a research organization. In certain ones of these embodiments, the research data source 360 comprises a location data producing device or function providing data indicating a location of the PDA 300. Various devices appropriate for use as source 360 include a satellite location signal receiver, a terrestrial location signal receiver, a wireless networking device that receives location data from a network, an inertial location monitoring device and a location data producing service provided by a cellular telephone service provider. In certain ones of these embodiments, research data source 360 comprises a device or function for monitoring exposure to print media, for determining whether the user is at home or out of home, for monitoring exposure to products, exposure to displays (such as outdoor advertising), presence within or near commercial establishments, or for gathering research data (such as consumer attitude, preference or opinion data) through the administration of a survey to the user of the PDA 300. In certain ones of these embodiments, research data source 360 comprises one or more devices for receiving, sensing or detecting data useful in implementing one or more of the foregoing functions, other research data gathering functions and/or for producing data ancillary to functions of gathering, storing and/or communicating research data, such as data indicating whether the panelist has complied with predetermined rules governing the activity or an extent of such compliance. Such devices include, but are not limited to, motion detectors, accelerometers, temperature detectors, proximity detectors, satellite positioning signal receivers, RFID readers, RF receivers, wireless networking transceivers, wireless device coupling transceivers, pressure detectors, deformation detectors, electric field sensors, magnetic field sensors, optical sensors, electrodes, and the like.

In addition, PDA 300 comprises a microphone 370 coupled with processor 310 to transduce the user's voice to an electrical signal which it supplies to processor 310 for encoding, and a speaker and/or earphone 380 coupled with processor 310 to transduce received audio from processor 310 to an acoustic output to be heard by the user. PDA 300 also includes a user input 340 coupled with processor 310, such as a keypad, to enter telephone numbers and other control data, as well as a display 350 coupled with processor 310 to provide data visually to the user under the control of processor 310.

In addition, PDA 300 comprises a personal communication device adapted to be carried on the person of a participant having a processor 310, and communications 320, and storage 330 coupled with processor 310. A research data source 360, adapted to be carried on the person of a participant, is operative to gather research data and communicate the same wirelessly to communications 320 of the personal communication device for subsequent communication by the personal communication device to a research data processing facility. In certain embodiments, research data source 360 comprises a microphone for receiving ambient acoustic energy and producing a corresponding electrical signal that is processed either by research data source 360 to read ancillary codes therein or extract signatures therefrom, or is instead processed for doing so by processor 310. In certain embodiments, the research data source 360 is separate from the personal communication device, so that it is carried by the participant separately therefrom. In certain ones of such embodiments, the research data source 360 is contained in a PUA such as an article of jewelry, an article of clothing, a fob, a wristwatch or other PUA. In certain ones of such embodiments, the research data source 360 is contained in its own enclosure and is carried on a lanyard to be worn about the participant's neck or provided with a pin, clasp or belt clip for attachment to an article of the participant's clothing.

In certain embodiments, a presentation device 390 is coupled with processor 310 for communicating presentation data and/or metadata. Subsequently the system reads the stored data from storage 330 and communicates it to PDA 300, via communications 320, which either processes it to produce research data therefrom or communicates it to a processing facility for producing research data. Presentation data may include data which is widely accessible over-the-air, or via cable, satellite, network, internetwork (including the Internet), print, displayed, distributed on storage media, or by any other means or technique that is humanly perceptible, without regard to the form or content of such data, and including but not limited to audio, video, text, images, animations, databases, files, broadcasts, displays (including but not limited to video displays, posters and billboards), signs, signals, web pages, print media and streaming media data.

Figure 4:
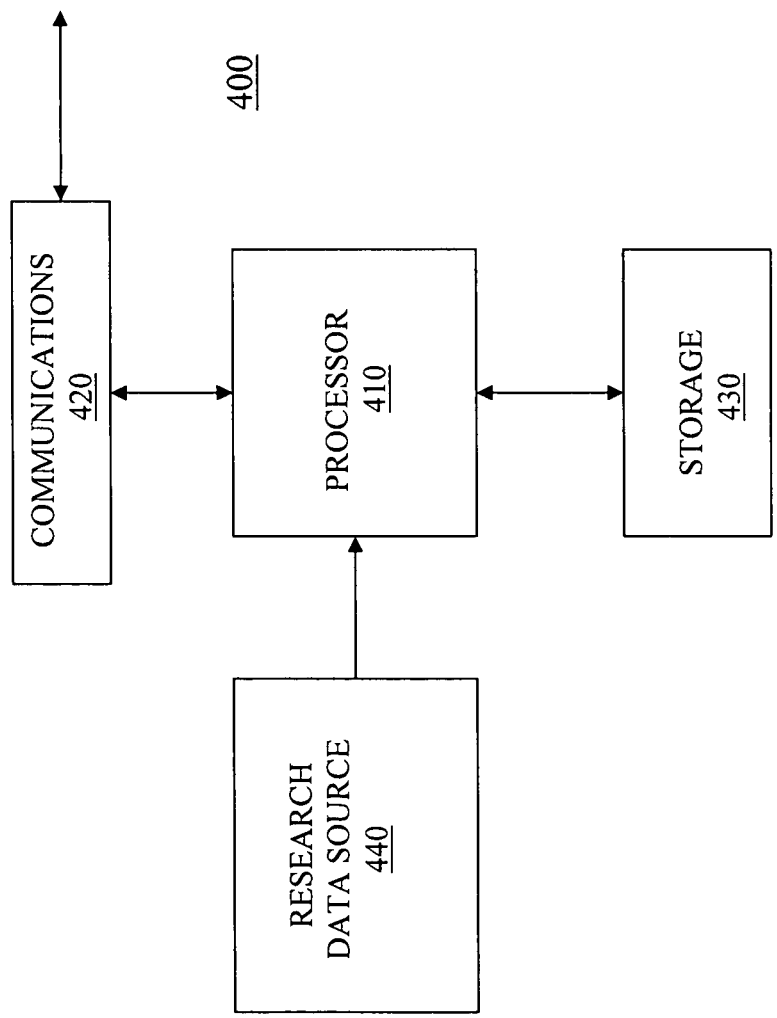
FIG. 4 is a block diagram of an external storage device modified to carry out research operations.

FIG. 4 is a block diagram of an external storage device 400, such as a portable storage drive, modified to gather research data. A storage 430, such as a flash memory, serves to store data for use by the user as well as research data. Access to storage 430 is controlled by a processor 410. In certain embodiments, storage 430 is partitioned into a portion used to store user data and a further portion used to store research data (as well as research software, if necessary, to run on processor 410). In certain embodiments, processor 410 dynamically partitions storage 430 into sections as needed so that each stores either user data or research data (and/or research software). Storage device 400 also comprises communications 420 coupled with processor 410 to receive data to be written in storage 430 and to communicate data read from storage 430. Communications 420 in certain embodiments communicates data by means of a connection, such as a USB interface, while in others communicates its data wirelessly, for example, by means of a Bluetooth protocol, wireless LAN protocol, infrared data link, inductive link or the like.

Storage device 400 also comprises a research data source 440 that provides research data to be stored in storage 430 and communicated to system 100 via communications 420. In certain embodiments, research data source 430 comprises an acoustic transducer, such as a microphone, and processing (not shown for purposes of simplicity and clarity) to produce audio data in compressed or uncompressed form to be stored in storage 430 under the control of processor 410. In certain embodiments, ancillary codes in the audio data are decoded by processing in research data source 440 and/or signatures are extracted from the audio data thereby to be stored in storage 430. In certain embodiments other or additional types of research data are gathered by source 440, such as those described hereinabove.

In certain embodiments, storage device 400 employs external power to write and read user data via communications 420, as in the case of a USB interface. In such embodiments, research data source 440 includes a power source (not shown for purposes of simplicity and clarity), such as a rechargeable battery, to provide power for operating research data source 440 and writing research data to the storage 430 while storage device 400 is not coupled to a source of external power.

In certain embodiments, communications between storage device 400 and system 100 of the kind described above in connection with PUA 20, are conducted without involving the user, so that a user input and display are not required. In certain embodiments, such communications are carried out by coupling storage device 400 with a networked host, such as a personal computer, cellular telephone or PDA to communicate with system 100. Of these embodiments, in some cases a user input and display of the networked host are used to carry out communications involving user interaction. In these cases, benefits for participating in a research operation to gather, store and/or communicate research data that require the user to carry the storage device 400 on his or her person, can be provided via the networked host or otherwise.

Figure 5:
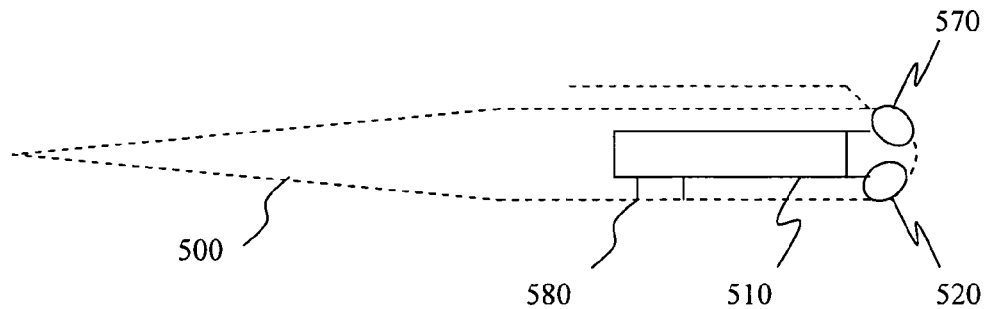
FIG. 5 illustrates a pen in phantom lines, having a research data collection system therein which serves to carry out research operations.
Figure 6:
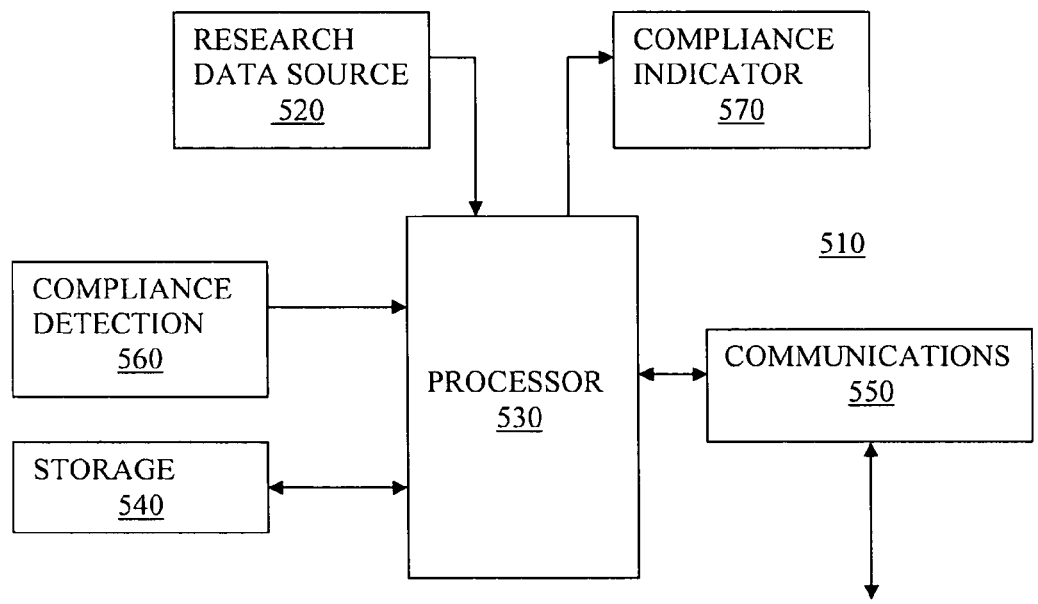
FIG. 6 is a block diagram of the research data collection system of FIG. 5.

FIG. 5 illustrates a pen 500 in phantom lines. A research data collection system 510 is contained within pen 500 and serves to gather research data of audio data to which a user carrying the pen is exposed. FIG. 6 is a block diagram of research data collection system 510.

With reference both to FIGS. 5 and 6, the research data collection system 510 includes a research data source 520 and a processor 530. The research data source 520 is coupled with processor 530 to provide research data therefrom or data from which research data may be produced. In certain embodiments, research data source 520 comprises a microphone operative to transduce acoustic energy to which a user of the pen 500 is exposed while carrying the pen to produce audio data. In such embodiments, processor 530 either stores the audio data or a compressed version thereof as research data in a storage 540 of the system 510 coupled with the processor 530, or extracts research data therefrom, such as data represented by an ancillary code of the audio data and/or a signature of the audio data which it stores in storage 540.

In certain embodiments, processor 530 comprises two or more processing devices, such as a first processing device that exercises overall control over operation of the system 510 and a second processing device that performs certain more specific operations such as digital signal processing. In certain embodiments, processor 530 employs a single processing device. In certain embodiments, some or all of the functions of processor 530 are implemented by hardwired circuitry. In certain embodiments, storage 540 comprises a single storage device, while in others it comprises multiple storage devices. In certain embodiments, a single device implements certain functions of both processor 530 and storage 540.

System 510 of pen 500 also includes communications 550 coupled with processor 530 to communicate stored research data to system 100 of FIG. 2, as well as to receive communications therefrom and communicate other types of communications thereto of the kind described hereinabove for setting up, promoting, operating, maintaining and/or terminating a research operation with the use of the pen 500. In certain embodiments, communications 550 serves to establish a wireless communications link with a host or device on a network to conduct such communications, while in certain embodiments, system 510 serves as a host or device on a network for conducting such communications. In certain embodiments, communications 550 communicates with system 100 via a separate PUA having the ability to communicate with system 100. In certain ones of such embodiments communications 550 establishes a wireless link with the separate PUA according to a Bluetooth™ or ZigBee™ communications standard.

System 510 of pen 500 further includes compliance detection 560 that operates to detect data useful in determining whether the user is in compliance with rules governing the research operation. In certain embodiments, compliance detection 560 comprises a motion detector, a temperature sensor and/or a proximity detector and is coupled with processor 530 to provide its data thereto. Processor 530 processes such data to determine whether the pen is being carried by the user at prescribed times. System 510 also includes a compliance indicator 570 coupled with processor 530 which processor 530 controls to provide to the user an indication whether the user is in compliance with rules for the research operation concerning carriage of the pen. In certain embodiments, the indicator 570 comprises a light, such as an LED, that provides a visual indication of compliance or non-compliance under the control of processor 530. In certain embodiments, the indicator 570 comprises an audio transducer that produces sound under the control of processor 530 to indicate such compliance or non-compliance. Additional disclosures of compliance determination and indication techniques suitable for use in the various embodiments disclosed herein are provided by U.S. Pat. No. 5,483,276 to Brooks, et al., assigned to the assignee of the present application and incorporated herein by reference in its entirety.

In certain embodiments, system 510 is powered by a rechargeable battery (not shown for purposes of simplicity and clarity). In such embodiments, recharging terminals 580 are provided for connecting system 510 to an external source of power for recharging such battery. In certain ones of such embodiments, the pen 510 is placed in a cradle of a base station (not shown for purposes of simplicity and clarity) where the terminals 580 contact terminals of the base station where recharging power is supplied. Appropriate base stations for this purpose are disclosed in U.S. Pat. No. 5,483,276, referenced above.

FIG. 7A illustrates an exemplary table of a relational database storing data associating individual PUA users with a group of persons receiving communication services pursuant to a single agreement with a communication service provider. The relational database is stored in storage 130 of FIG. 2 under the control of processor 110. Processor 110 stores data identifying each of a plurality of PUA users in the table of FIG. 7A to associate such data with data 700 identifying a group agreement governing the provision of communication services to a group of persons. For example, the group agreement may comprise a family plan with a cellular telephone service provider. The exemplary table of FIG. 7A associates data identifying four individual users (USER #3456. USER #3457, USER #3458, and USER #3459) with a particular group agreement 700. In certain embodiments, the association of data indicates which particular user in the group is using a particular PUA. In certain embodiments, the data identifying the PUA user comprises a screen name adopted by the PUA user.

FIG. 7B illustrates a further exemplary table of the relational database of FIG. 7A that stores data associating demographic data of the four PUA users with data identifying with each respective user, that is, 3456, 3457, 3458 and 3459. Processor 110 stores data in the table of FIG. 7B to associate demographic data of the PUA user with the data identifying the PUA user. For example, user #3456 corresponds to demographic data 710 which identifies the user as a female of age 40. Likewise, user #3457 corresponds to demographic data 720, user #3458 corresponds to demographic data 730, and user #3459 corresponds to demographic data 740. The demographic data may comprise information relating to sex, age, occupation, salary, etc. In certain embodiments, the association of data may indicate the demographic data of the particular user of the particular PUA.

In certain embodiments, a message is communicated from system 100 of FIG. 2 to each respective PUA user requesting the demographic data of such user and a message containing the demographic data is received by system 100 from the respective PUA user in response. In certain ones of such embodiments, such messages are communicated to and from the user's PUA. In certain ones of these embodiments, a message is communicated to the respective PUA user in response to a message from the PUA user indicating an interest in participating in the research operation.

Various illustrative PUA's are presented herein, such as cellular telephones, PDA's, portable storage devices, pens, and notebook computers. As previously discussed, however, many different types of devices, electronic and non-electronic, may be employed as a PUA in accordance with various embodiments described herein. For example, a belt buckle, ring, watch, shoe, etc., may be retrofitted with technology that implements a designated secondary function to enable the gathering of research data. Thus, the scope hereof is not limited to devices that have technical features or technical capabilities as their primary or only function.

In general, the embodiments described herein employ PUA's for the purpose of carrying out research operations, which are also the kinds of devices or articles that individuals have already freely chosen to use or carry for other purposes beneficial to them. Hence, recruited panel members are not burdened with the task of carrying around a device that they would otherwise not carry around. Moreover, in many embodiments, implementation of the research operation by the user's PUA is transparent to the user.

Although various embodiments have been described with reference to a particular arrangement of parts, features and the like, these are not intended to exhaust all possible arrangements or features, and indeed many other embodiments, modifications and variations will be ascertainable to those of skill in the art.

What is claimed is:

1. A computer-implemented method of initiating participation in a computer system of a PUA user in a research operation using a respective one of a plurality of PUA's providing communication services pursuant to a single agreement with a communication service provider, comprising:
   associating data identifying the PUA user in the computer system with data identifying a group of persons receiving communication services pursuant to the single agreement;
   associating demographic data of the PUA user in the computer system with the data identifying the PUA user; and
   gathering media exposure data for the PUA user pursuant to the research operation, the media exposure data comprising information regarding exposure to media content in a plurality of different mediums.

2. The computer-implemented method of claim 1, wherein the data identifying the PUA user comprises a screen name adopted by the PUA user.

3. The computer-implemented method of claim 1, comprising communicating a message to the respective one of the plurality of PUA's requesting the demographic data of the PUA user and receiving a message comprising the demographic data of the PUA user from the respective one of the plurality of PUA's.

4. The computer-implemented method of claim 3, comprising communicating the message to the respective one of the plurality of PUA's in response to receipt of a message from the PUA user indicating interest in participating in the research operation.

5. The computer-implemented method of claim 1, wherein the associating of data identifying the PUA user with data identifying a group indicates which particular user in the plurality of PUA's is using a particular PUA.

6. The computer-implemented method of claim 5, wherein the associating of demographic data of the PUA user with data identifying the PUA user indicates the demographic data of the particular user.

7. The computer-implemented method of claim 6, wherein the demographic data of the particular user is communicated to a processing facility.

8. A computer-implemented method of initiating participation in a computer system of a PUA user in a research operation using a respective one of a plurality of PUA's providing communication services pursuant to a single agreement with a communication service provider, comprising:
   associating data identifying the PUA user in the computer system with data identifying a group of persons receiving communication services pursuant to the single agreement;
   receiving demographic data of the PUA user;
   associating the demographic data of the PUA user in the computer system with the data identifying the PUA user;
   gathering media exposure data for the PUA user pursuant to the research operation, the media exposure data comprising information regarding exposure to media content in a plurality of different mediums.

9. The computer-implemented method of claim 8, wherein the data identifying the PUA user comprises a screen name adopted by the PUA user.

10. The computer-implemented method of claim 8, comprising communicating a message to the respective one of the plurality of PUA's requesting the demographic data of the PUA user and receiving a messag e comprising the demographic data of the PUA user from the respective one of the plurality of PUA's.

11. The computer-implemented method of claim 10, comprising communicating the message to the respective one of the plurality of PUA's in response to receipt of a message from the PUA user indicating interest in participating in the research operation.

12. The computer-implemented method of claim 8, wherein the associating of data identifying the PUA user with data identifying a group indicates which particular user in the plurality of PUA's is using a particular PUA.

13. The computer-implemented method of claim 12, wherein the associating of demographic data of the PUA user with data identifying the PUA user indicates the demographic data of the particular user.

14. A system for initiating participation of a PUA user in a research operation using a respective one of a plurality of PUA's providing communication services pursuant to a single agreement with a communication service provider, comprising:
   a processor configured to associate data identifying the PUA user with data identifying a group of persons receiving communication services pursuant to the single agreement,
   the processor being further configured to associate demographic data of the PUA user with the data identifying the PUA user; and
   communications for gathering media exposure data for the PUA user pursuant to the research operation, the media exposure data comprising information regarding exposure to media content in a plurality of different mediums.

15. The system of claim 14, wherein the data identifying the PUA user comprises a screen name adopted by the PUA user.

16. The system of claim 14, comprising communications coupled with the respective one of the plurality of PUA's to communicate a message to the respective one of the plurality of PUA's requesting the demographic data of the PUA user and to receive a message comprising the demographic data of the PUA user from the respective one of the plurality of PUA's.

17. The system of claim 16, wherein the communications is operative to communicate the message to the respective one of the plurality of PUA's in response to receipt of a message from the PUA user indicating interest in participating in the research operation.

18. The system of claim 14, wherein the associating of data identifying the PUA user with data identifying a group indicates which particular user in the plurality of PUA's is using a particular PUA.

19. The system of claim 18, wherein the associating of demographic data of the PUA user with data identifying the PUA user indicates the demographic data of the particular user.

20. The system of claim 19, wherein the demographic data of the particular user is communicated to a processing facility.

21. The system of claim 14, further comprising storage coupled with the processor, and wherein the processor is operative to store the data identifying the PUA user in association with the data identifying the group of persons in the storage, and to store the demographic data of the PUA user in association with the data identifying the PUA user in the storage.

22. The system of claim 21, wherein the processor is operative to store the data identifying the PUA user in association with the data identifying the group of persons in a first table of a relational database, and to store the demographic data of the PUA user in association with the data identifying the PUA user in a second table of the relational database.

23. A system for initiating participation of a PUA user in a research operation using a respective one of a plurality of PUA's providing communication services pursuant to a single agreement with a communication service provider, comprising:
  a processor configured to associate data identifying the PUA user with data identifying a group of persons receiving communication services pursuant to the single agreement;
  communications coupled with the processor and operative to receive demographic data of the PUA user;
  the processor being operative to associate the demographic data of the PUA user with the data identifying the PUA user; and
  wherein the communications is operative for gathering media exposure data for the PUA user pursuant to the research operation, the media exposure data comprising information regarding exposure to media content in a plurality of different mediums.

24. The system of claim 23, wherein the data identifying the PUA user comprises a screen name adopted by the PUA user.

25. The system of claim 23, wherein the communications is operative to communicate a message to the respective one of the plurality of PUA's requesting the demographic data of the PUA user and to receive a message comprising the demographic data of the PUA user from the respective one of the plurality of PUA's.

26. The system of claim 25, wherein the communications is operative to communicate the message to the respective one of the plurality of PUA's in response to receipt of a message from the PUA user indicating interest in participating in the research operation.

27. The system of claim 23, wherein the associating of data identifying the PUA user with data identifying a group indicates which particular user in the plurality of PUA's is using a particular unit.

28. The system of claim 27, wherein the associating of demographic data of the PUA user with data identifying the PUA user indicates the demographic data of the particular user.

29. The system of claim 23, further comprising storage coupled with the processor, and wherein the processor is operative to store the data identifying the PUA user in association with the data identifying the group of persons in the storage, and to store the demographic data of the PUA user in association with the data identifying the PUA user in the storage.

30. The system of claim 29, wherein the processor is operative to store the data identifying the PUA user in association with the data identifying the group of persons in a first table of a relational database, and to store the demographic data of the PUA user in association with the data identifying the PUA user in a second table of the relational database.

* * * * *